(12) United States Patent
Shiraishi et al.

(10) Patent No.: US 7,669,623 B2
(45) Date of Patent: Mar. 2, 2010

(54) ELASTIC WHEEL AND METHOD OF MANUFACTURING THE SAME

(75) Inventors: Masaki Shiraishi, Kobe (JP); Tadashi Imamura, Tokyo (JP); Yoshiaki Kimura, Tokyo (JP); Kenji Maki, Tokyo (JP)

(73) Assignees: Sumitomo Rubber Industries, Ltd., Kobe-Shi (JP); Topy Industries, Ltd., Tokyo (JP)

( * ) Notice: Subject to any disclaimer, the term of this patent is extended or adjusted under 35 U.S.C. 154(b) by 811 days.

(21) Appl. No.: 10/584,190

(22) PCT Filed: Jun. 1, 2005

(86) PCT No.: PCT/JP2005/010059
§ 371 (c)(1),
(2), (4) Date: Jun. 23, 2006

(87) PCT Pub. No.: WO2005/118312
PCT Pub. Date: Dec. 15, 2005

(65) Prior Publication Data
US 2009/0026830 A1     Jan. 29, 2009

(30) Foreign Application Priority Data
Jun. 1, 2004 (JP) .............................. 2004-163525
Jul. 26, 2004 (JP) .............................. 2004-217592

(51) Int. Cl.
*B60B 9/10* (2006.01)
(52) U.S. Cl. .......................................... 152/47; 152/41
(58) Field of Classification Search ................... 152/17, 152/32–33, 40–41, 47–48, 50–52; 295/11–12; 301/11.1, 11.3, 95.101
See application file for complete search history.

(56) References Cited
U.S. PATENT DOCUMENTS 3,130,766 A * 4/1964 Arnot ............................ 152/41
4,549,590 A  10/1985 Sahagian (Continued)

FOREIGN PATENT DOCUMENTS

JP         2001-88502 A      4/2001

(Continued)

*Primary Examiner*—Jason R Bellinger
(74) *Attorney, Agent, or Firm*—Birch, Stewart, Kolasch & Birch, LLP

(57) ABSTRACT

An elastic wheel comprises a rim for mounting a tire, a disk to be fixed to an axle, and a connecting apparatus for connecting elastically between the rim and disk, the apparatus comprising a pair of axially spaced internal flanges each provided on an inner circumference side of the rim and extending circumferentially, an external flange provided on a radially outer portion of the disk, the external flange disposed in a space between the internal flanges with an axial gap on its both sides and extending circumferentially, a pair of rubber dampers each disposed in the axial gap and connecting between the internal and external flanges, wherein each internal flange is provided on its axially inner side with a first groove, the external flange is provided on its both sides with a second groove so as to face each first groove, axial ends of each damper are inserted into the first and second grooves, and a radial gap is provided between the external flange and the inner circumference side of the rim in the space.

18 Claims, 20 Drawing Sheets

U.S. PATENT DOCUMENTS

| | | |
|---|---|---|
| 4,765,382 A | 8/1988 | Sahagian |
| 6,732,775 B1 * | 5/2004 | Kikuchi et al. ................ 152/47 |
| 2003/0141642 A1 | 7/2003 | Uchida et al. |

FOREIGN PATENT DOCUMENTS

| | | |
|---|---|---|
| JP | 2002-96604 A | 4/2002 |
| JP | 2002-234302 A | 8/2002 |
| JP | 2003-104001 A | 4/2003 |
| JP | 2004-284538 A | 10/2004 |
| WO | WO-02/04235 A1 | 1/2002 |
| WO | WO-02/098681 A1 | 12/2002 |

* cited by examiner

ELASTIC WHEEL AND METHOD OF MANUFACTURING THE SAME

BACKGROUND OF THE INVENTION

1. Field of the Invention

The present invention relates to an elastic wheel capable of enhancing riding comfort and noise-reduction performance, and to a manufacturing method of such an elastic wheel.

2. Description of the Related Art

In order to enhance riding comfort and silence degree of a vehicle, there is proposed a vehicular elastic wheel as described for example in JP-A 2003-104001.

As shown in FIG. 21, this elastic wheel includes a rim "a" for supporting a tire, a disk b to be fixed to an axle, and a rubber damper c made of elastic rubber for connecting the rim "a" and the disk b. A gap d is provided between an inner circumference side of the rim "a" and a radially outer portion of the disk b. Therefore, a load variation in the radial direction applied to the elastic wheel is absorbed by shearing deformation of the rubber damper c. Thus, the elastic wheel exhibit high buffering effect with respect to small vibration input from a road, and the riding comfort and noise-reduction performance are largely enhanced. When a load in the direction of the axle is applied to the elastic wheel, a portion of the rubber damper c is compressed and deformed and thus, the rigidity is maintained at high level and steering stability is maintained.

According to the conventional elastic wheel, however, the rubber damper c is fixed, by means of vulcanization adhesion, to the disk b and a mounting bracket e which is integrally provided on the rim "a". Therefore, much time and labor are required for vulcanization adhesion, and there is a problem that the manufacturing cost is increased and productivity is deteriorated.

SUMMARY OF THE INVENTION

It is a main object of the present invention to provide an elastic wheel capable of fixing the rubber damper between the rim and the disk without using the vulcanization adhesion. It is another object of the invention to provide an elastic wheel capable of highly maintaining the steering stability while enhancing the riding comfort and noise-reduction performance. It is another object of the invention to provide a manufacturing method of the elastic wheel capable of reducing the cost and enhancing the productivity.

According to the present invention, an elastic wheel comprises a rim for mounting a tire extending in a circumferential direction, a disk to be fixed to an axle, and a connecting apparatus for connecting elastically between the rim and the disk, the connecting apparatus comprising a pair of axially spaced internal flanges each provided on an inner circumference side of the rim and protruding therefrom toward radially inwardly and extending in the circumferential direction, an external flange provided on a radially outer portion of the disk, the external flange disposed in a space between the internal flanges with an axial gap on its both sides and extending in the circumferential direction, a pair of rubber dampers each disposed in the axial gap and connecting between the internal and external flanges, wherein each internal flange is provided on its axially inner side with at least one first groove extending in the circumferential direction, the external flange is provided on its both sides with at least one second groove extending in the circumferential direction so as to face the first groove of each internal flange, axial one end of each rubber damper is inserted into the first groove of the internal flange and the other end is inserted into the second groove of the external flange, and a radial gap is provided between the external flange and the inner circumference side of the rim in the space.

According to the elastic wheel having the above-described structure, the rubber damper is tightly fixed to the grooves of the flanges of the rim and the disk utilizing the friction force. Therefore, it is unnecessary to use the vulcanization adhesion unlike the conventional technique. According to the manufacturing method of the elastic wheel, the rubber damper made of previously vulcanized rubber elastic material is disposed in the first and second grooves and compressed and supported in the direction of the axle. Therefore, the rubber damper is strongly fixed to the rim and the disk by the strong friction force, and it is unnecessary to vulcanize for attaching. Therefore, according to the manufacturing method of the invention, it is possible to provide an efficient manufacturing method of an elastic wheel requiring no vulcanization adhesion.

DESCRIPTION OF THE PREFERRED EMBODIMENTS

Figure 1:
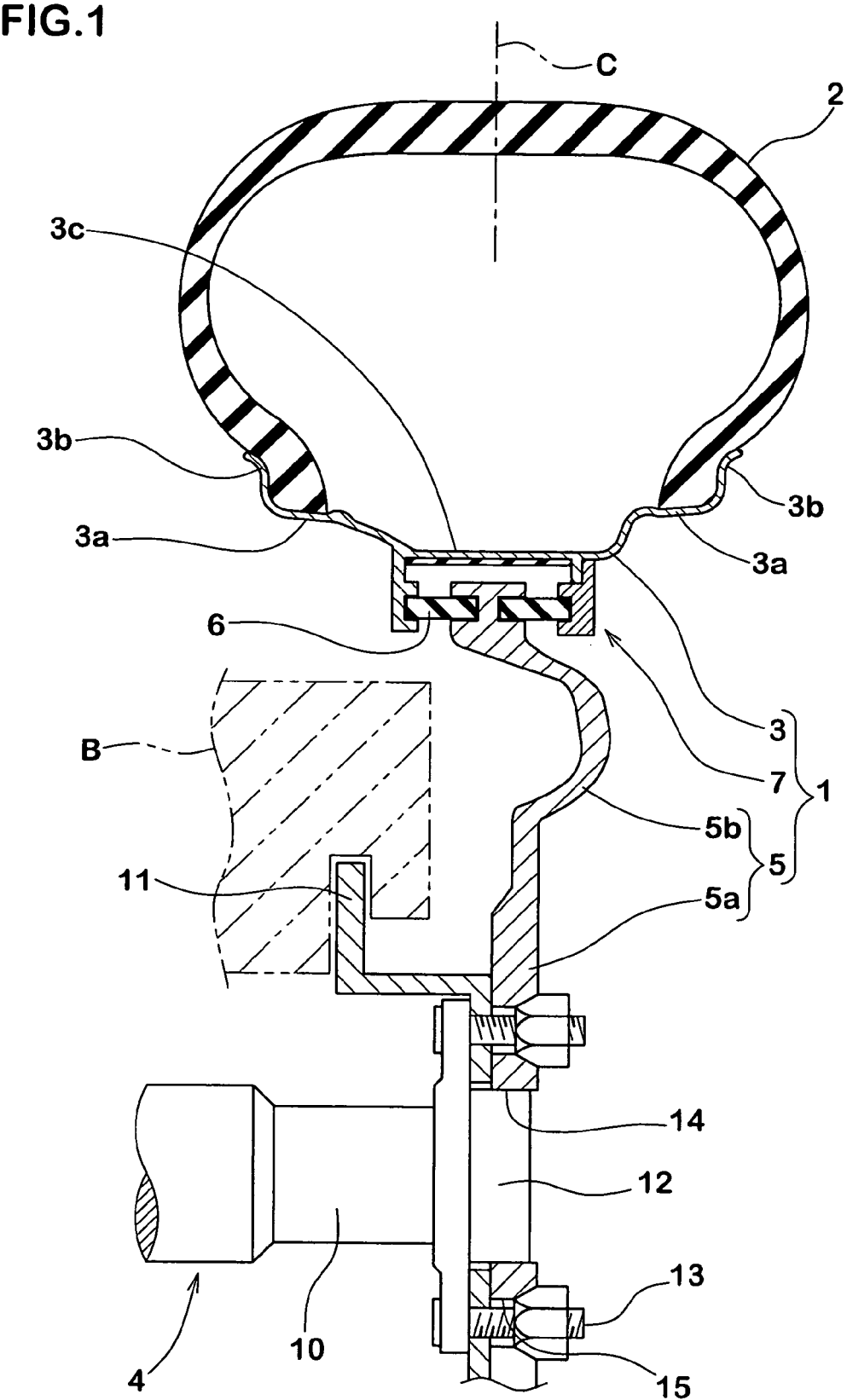
FIG. 1 is a sectional view showing an embodiment of an elastic wheel of the present invention.

A description will be given of an embodiment in accordance with the present invention with reference to the accompanying drawings.

An elastic wheel 1 shown in FIG. 1 comprises a rim 3 which supports a pneumatic tire for automobile (simply "tire", hereinafter) 2, a disk 5 fixed to an axle 4, and a connecting apparatus 7 which elastically connects between the rim 3 and the disk 5 with each other.

The rim 3 comprises a pair of rim seats 3a on which a bead portion of the tire 2 sits, a rim-flange 3b which extends radially outward from an axially outer end of each of the rim seats 3a, and a recessed well portion 3c with the smallest outer diameter and provided between the rim seats 3a. The rim 3 is an annular body in which its cross section shape continuously extends in the circumferential direction. In this embodiment, the well portion 3c is relatively deep, but the shape thereof is not especially limited.

The disk 5 comprises a hub-mount 5a to be fixed to the hub 10, and an outer portion 5b extending from the hub-mount 5a to radially outwardly in one body. In this embodiment, the disk 5 is offset and disposed on the axially outer side than the center C of the rim width.

A brake rotor 11 is mounted between the hub 10 of the axle 4 and the disk 5. The brake rotor 11 is sandwiched between the brake apparatus B. A flange of the hub 10 is provided with a projecting portion 12 which is concentric with the axle 4, and a plurality of (e.g., four) hub bolts 13 for mounting the wheel 1 disposed around the projecting portion 12 at equal angle pitch.

The hub-mount 5a is provided at its center with a center hole 14 into which the projecting portion 12 is inserted, and bolt holes 15 formed around the center hole 14 and into which the hub bolts 13 are inserted.

In this embodiment, the rim 3 and the disk 5 are made of substantially inexpansible metal such as iron, aluminum alloy and magnesium alloy.

Figure 2:
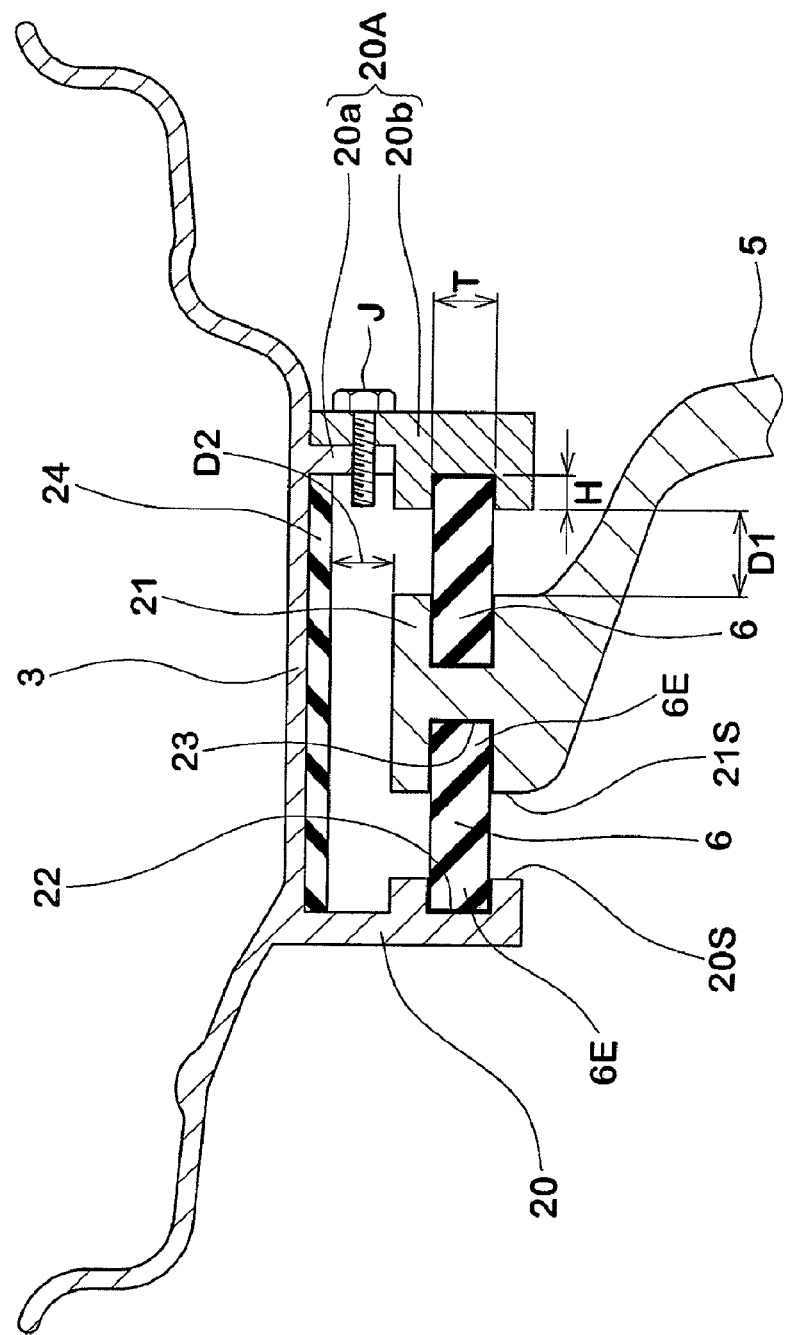
FIG. 2 is a partial enlarged view thereof.

As shown in FIG. 2, the connecting apparatus 7 comprises: a pair of axially spaced internal flanges 20 which project radially inwardly from the inner circumference side of the rim 3; an external flange 21 which is provided on the radially outer portion of the disk 5 and disposed in a space between the internal flanges 20 with an axial gap D1 on its both sides and extend in the circumferential direction; and a pair of rubber dampers 6 which are made of rubber elastic material and disposed in the axial gaps D1.

Each internal flange 20 is of an inwardly directed projecting part which projects radially inward from the inner circumference side of the rim 3. Each internal flange 20 has its axially inner sides 20S which is provided with a first groove 22 extending in the circumferential direction.

In the embodiment, at least one of the internal flanges 20, preferably the internal flange 20A located on the outer side of the vehicle, is provided so that the internal flange 20A can be attached and detached to and from the rim 3. More specifically, such an internal flange 20A comprises a base portion 20a which projects from the rim 3 radially inward with a small height, and a flange plate 20b which is detachably mounted on the base portion 20a by a screw device J. With this, the assembling operation of the elastic wheel 1 can be carried out efficiently, and this simplifies the maintenance operation such as exchanging of the rubber damper 6. The screw device J is a bolt in this embodiment, but the screw device J is not limited to this.

The axial Gaps D1 are provided on both sides of the external flange 21 in the space between the internal flanges 20. Also, a radial gap D2 is provided between the external flange 21 and the inner circumference side of the rim 3 in the space.

The external flange 21 is provided on its both sides with a pair of second grooves 23 each extending in the circumferential direction and facing each first groove 22.

The external flange 21 is provided on its both sides 21S with a second groove 23 extending in the circumferential direction so as to face the first groove 22 of each internal flange 20.

In this embodiment, each rubber damper 6 has a rectangular cross section, and is made of rubber elastic material having substantially constant thickness. The rubber damper 6 is disposed such as to connect the gaps D1. More specifically, both ends 6E of the rubber damper 6 in the axial direction are respectively inserted into the pair of first groove 22 and second groove 23, and are in tight contact with surfaces of the grooves. In the gap D1, outer and inner surfaces of the rubber damper 6 in the radial direction are not restrained from outside.

The rubber damper 6 is held by both the internal flange 20 and the external flange 21 under the friction force. The rubber damper 6 and the rim 3, as well as the rubber damper 6 and the disk 5 are strongly and reliably connected to each other without using vulcanization adhesion.

According to such an elastic wheel 1, a variation in load in the radial direction between the rim 3 and the disk 5 can be absorbed by shearing deformation of the rubber damper 6. Excellent buffering effect is exhibited with respect to small vibration input, and the riding comfort and the noise-reduction performance can largely be enhanced.

Figure 3:
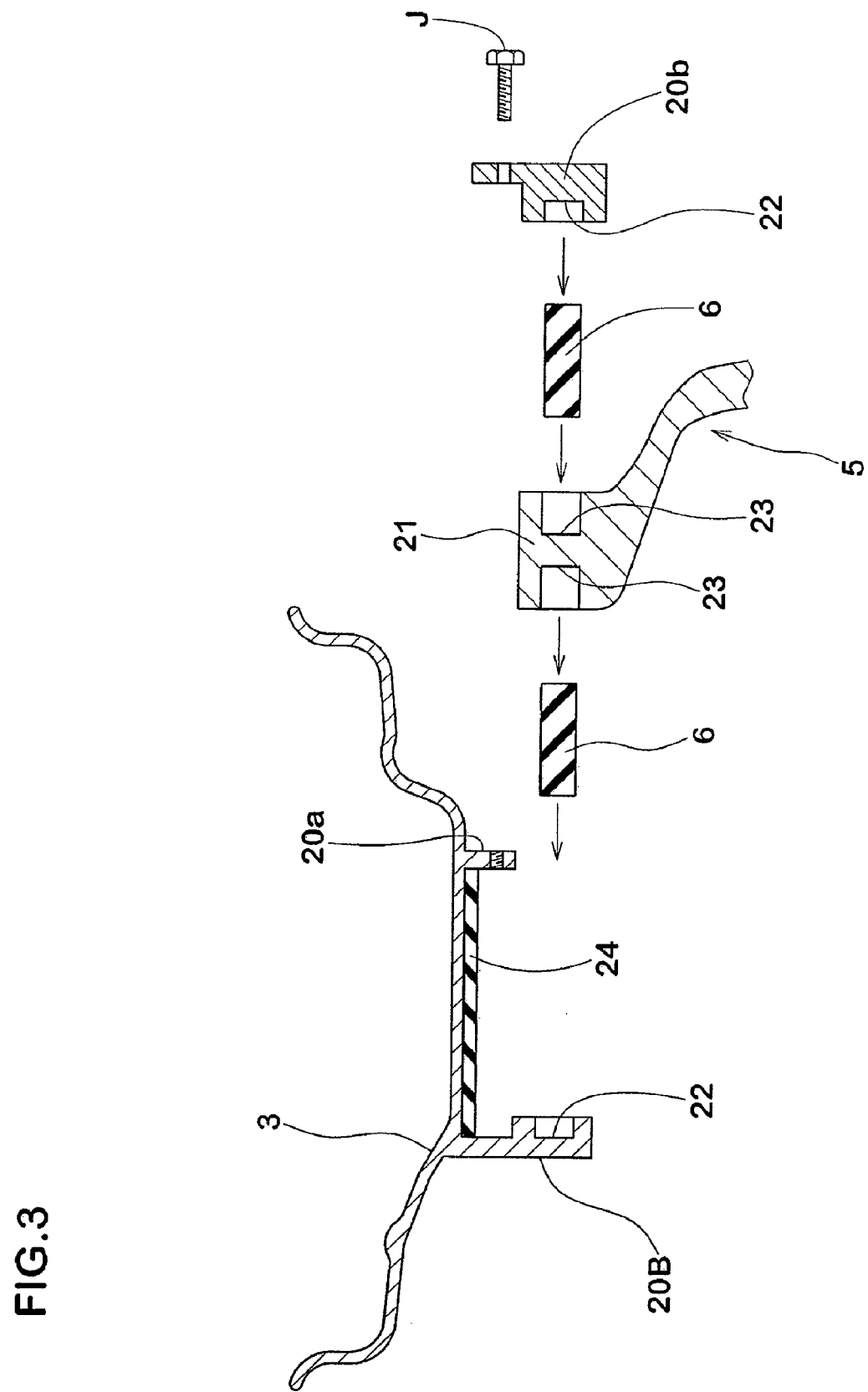
FIG. 3 is an exploded perspective view of FIG. 2.

As shown in FIG. 3, according to the elastic wheel 1 of this embodiment, the one rubber damper 6, the disk 5 with external flange 21 and the other rubber damper 6 are sequentially inserted into the other internal flange 20B of the rim 3 (the internal flange 20B is located on the inner side of the vehicle in this embodiment) from outward of the vehicle, and they are temporarily assembled. In this stage, the rubber dampers 6 are previously vulcanized. After that, the flange plate 20b is fixed to the base portion 20a of the rim 3 by the screw device J. With this, the elastic wheel 1 is easily and efficiently manufactured.

According to this connecting method of the rubber damper 6, time and labor required for vulcanization adhesion heretofore are eliminated, the manufacturing cost can be reduced and productivity can be enhanced.

when there is large vibration input in the radial direction, the radially outer circumference side of the external flange 21 and the inner circumference surface of the rim 3 may come into direct contact with each other and the riding comfort and noise-reduction performance may be deteriorated in some cases. Hence, according to the elastic wheel 1 of this embodiment, at least one of the outer circumference side of the external flange 21 and the inner circumference side of the rim 3 is provided with a buffering material 24 for buffering impact at the time of contact. In this embodiment, the buffering material 24 is provided on the inner circumference side of the rim 3. The radial gap D2 is secured between the buffering material 24 and the other surface (outer circumference side in this example).

In the elastic wheel 1, a portion of the rubber damper 6 is compressed and deformed with respect to a load in the axial direction of the tire and thus, the rigidity in the tire axial direction can be maintained at high level. Thus, even if the rubber damper 6 is used, deterioration of the steering stability is suppressed.

To sufficiently secure the friction force between the rubber damper 6 and the rim 3 or the disk 5, it is preferable that each of the grooves 22 and 23 has a depth H of not less than 3 mm, more preferably not less than 5 mm and more preferably not less than 8 mm.

Figure 4:
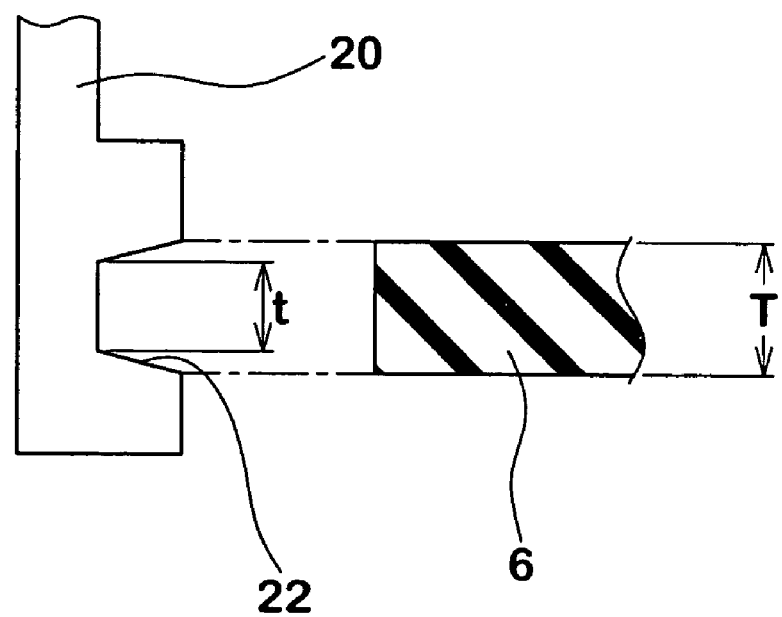
FIG. 4 is a partial sectional view showing another embodiment of a first groove.

To enhance the steering stability, it is preferable that the first groove 22, the second groove 23 and the rubber damper 6 come into contact with each other under high pressure. AS shown in FIG. 4 for example, it is preferable that a groove width t of each of the first and second grooves 22 and 23 is smaller than a thickness T of the rubber damper 6. In this example, the groove width t is smoothly reduced toward the groove bottom so that the grooves 22 and 23 are tapered. Such first and second grooves 22 and 23 are preferable because they come into contact with the rubber damper 6 under high pressure and high friction force is produced.

It is preferable that in the gap D1, the rubber damper 6 has the rubber thickness T of not less than 8 mm, preferably not less than 10 mm, and its upper limit is preferably not more than 30 mm. When the rubber thickness T is less than 8 mm, the rubber damper 6 may be bent and deformed when a load in the axial direction is applied to the rubber damper 6. If the thickness T exceeds 30 mm on the contrary, there is a tendency that the vertical rigidity (radial rigidity) or weight of the elastic wheel 1 is increased.

It is preferable that the gap D1 is in the range of from 50 to 200% of the rubber thickness T. If the gap D1 is less than 50% of the rubber thickness T, there is a possibility that the radial flexure of the rubber damper 6 is suppressed to a small value. If the gap D1 exceeds 200% of the rubber thickness T, there is a tendency that buckling occurs in the rubber damper 6 when a load in the axial direction is applied, or its weight is increased.

To enhance the absorption effect of vibration and durability, it is preferable that the rubber damper 6 has rubber hardness in the range of from 10 to 50 degrees (durometer A hardness), complex elastic modulus E in the range of from 1.0 to 5.0 MPa, and loss tangent (tangent delta) in the range of from 0.05 to 0.2. The complex elastic modulus E and the loss tangent (tangent delta) are values measured by a viscoelasticity spectrometer under a condition of temperature of 70 degrees C., initial extension of 10%, dynamic distortion of plus-minus 1.0% and frequency of 10 Hz.

Although rubber elastic material for the rubber damper 6 is not especially limited, preferable examples of the rubber elastic material are: diene-based rubber such as nitrile rubber (NBR), styrene butadiene rubber (SBR), butadiene rubber (BR), natural rubber (NR) and isoprene rubber (IR); and non-diene-based rubber such as butyl rubber (IIR) and ethylene propylene rubber (EPDM). Addition agent such as rubber reinforcing agent, vulcanization agent, accelerator, wax and/ or antioxidant is appropriately mixed as required.

As for the buffering material 24, rubber materials having low elasticity and high attenuation effect having small rubber hardness, complex elastic modulus E and loss tangent are preferably used.

Figure 5A:
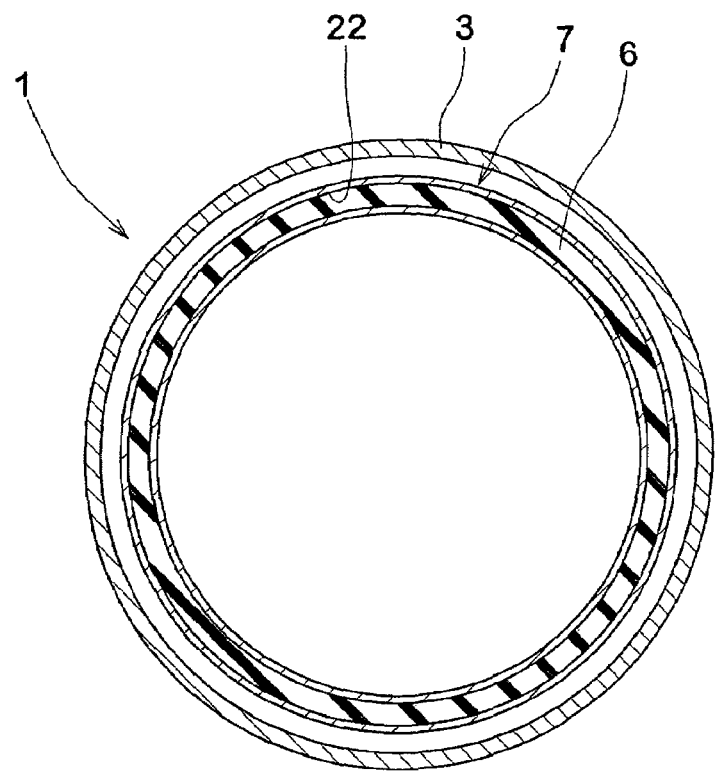
FIG. 5(A) is a sectional view taken along the circumferential direction of an embodiment in which a groove and a rubber damper are continuous in the circumferential direction.

Further, in order to make the connecting apparatus 7 transmit torque between the axle 4 and the rim 3 reliably, preventing a large slip in the circumferential direction between the internal flange 20 and the external flange 21 is preferable. The elastic wheel 1 of the this embodiment, since the rubber dampers 6 are inserted into the grooves 22 and 23 and tightly contacted with the groove surfaces, a large friction force is applied therebetween. Therefore, as shown in FIG. 5(A), even if the rubber damper 6 and the grooves 22 and 23 are continuous in the circumferential direction, the internal flange 20 and the external flange 21 are prevented from being largely slip in the circumferential direction.

Figure 5B:
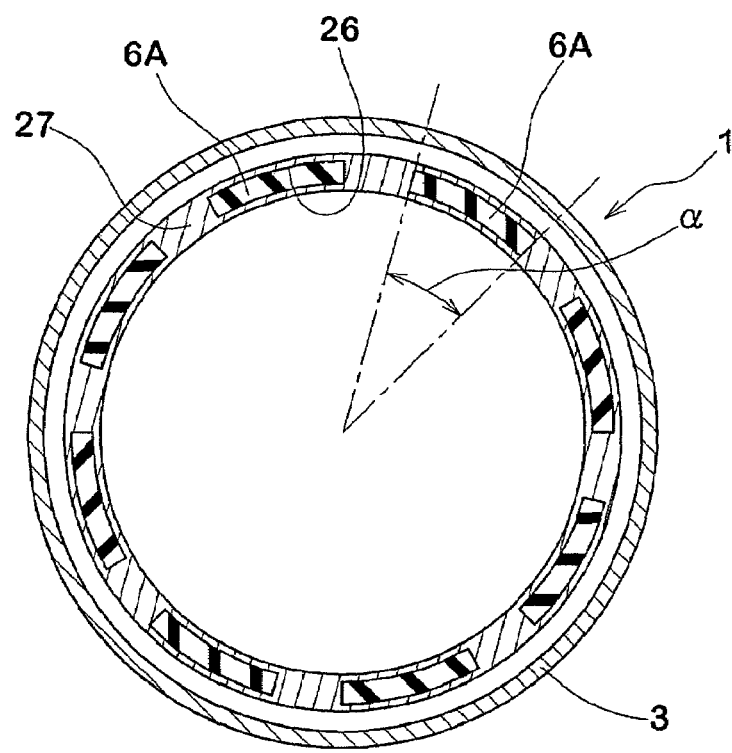
FIG. 5(B) is a sectional view in the circumferential direction of an embodiment with circumferentially spaced grooves and rubber dampers.
Figure 6:
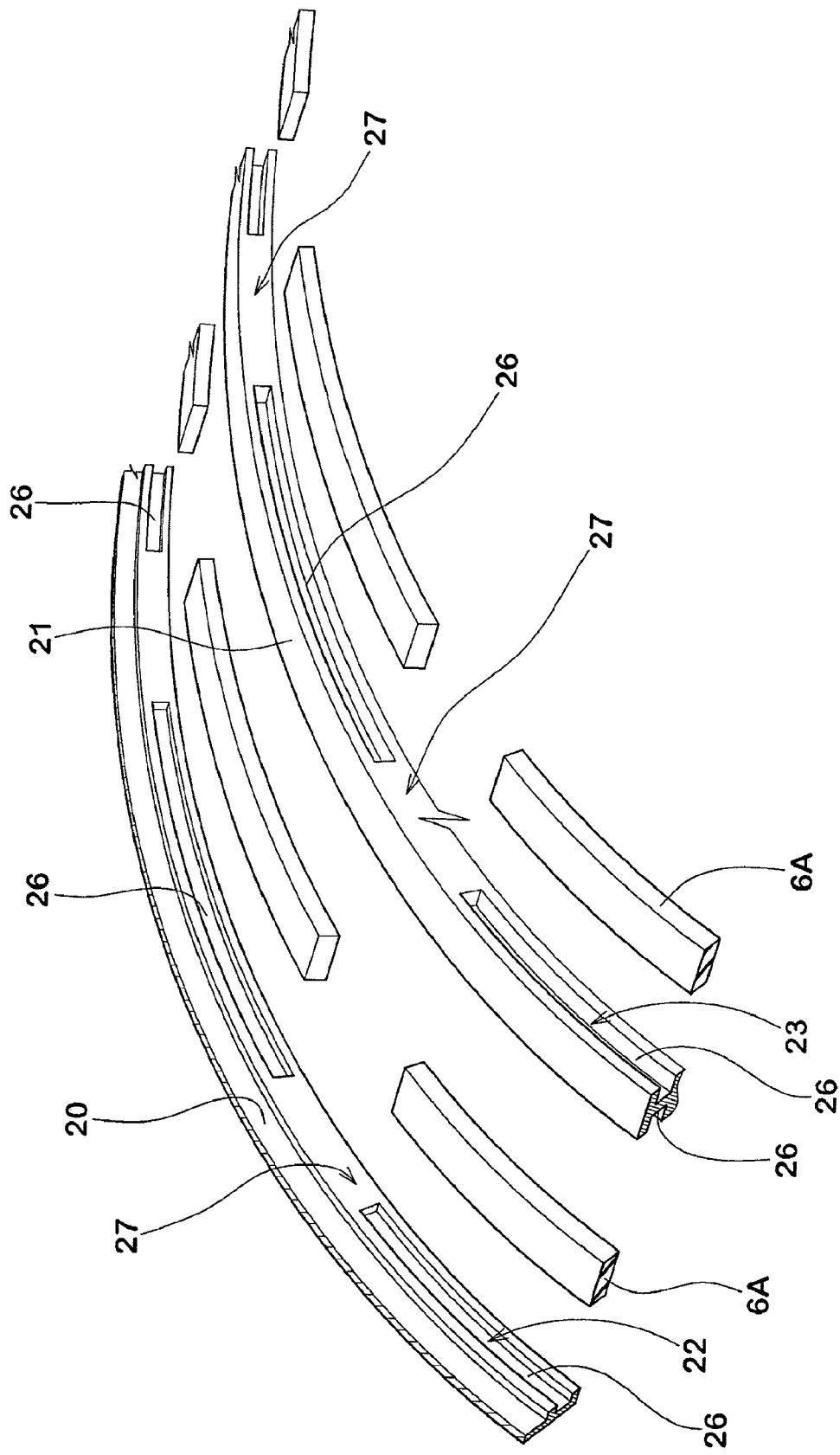
FIG. 6 is an exploded perspective view of a part of FIG. 5(B)

To prevent the large slip in the circumferential direction more reliably, as shown in FIG. 5(B) and FIG. 6, as for each first and second grooves 22 and 23, a plurality of circumferentially spaced groove segments 26 arranged along the circumferential direction may be used.

Further, as for the rubber damper 6, a plurality of damper segments 6A fitted into the grooves 26 may be used, respectively.

In the elastic wheel having such a structure, a partition 27 between the groove segments 26 can work as a stopper which limits the movement of the damper segments 6A in the circumferential direction. Therefore, according to such an embodiment, the large slip in the circumferential direction between the internal and external flanges 20 and 21 is more reliably prevented by synergistic effect of the partition 27 and the friction force.

In this embodiment, it is preferable that the number of divisions of the damper segments 6A (the number of divisions in each side of the external flange 21) is in a range of from 8 to 20. The length of the damper segment 6A in the circumferential direction is preferably in a range of from 50 to 80% of the 360/n ("n" means the number of damper segments) around a center angle alpha from the tire axis. FIG. 5 shows a cases in which n=8 and alpha=30 degrees.

Figure 7:
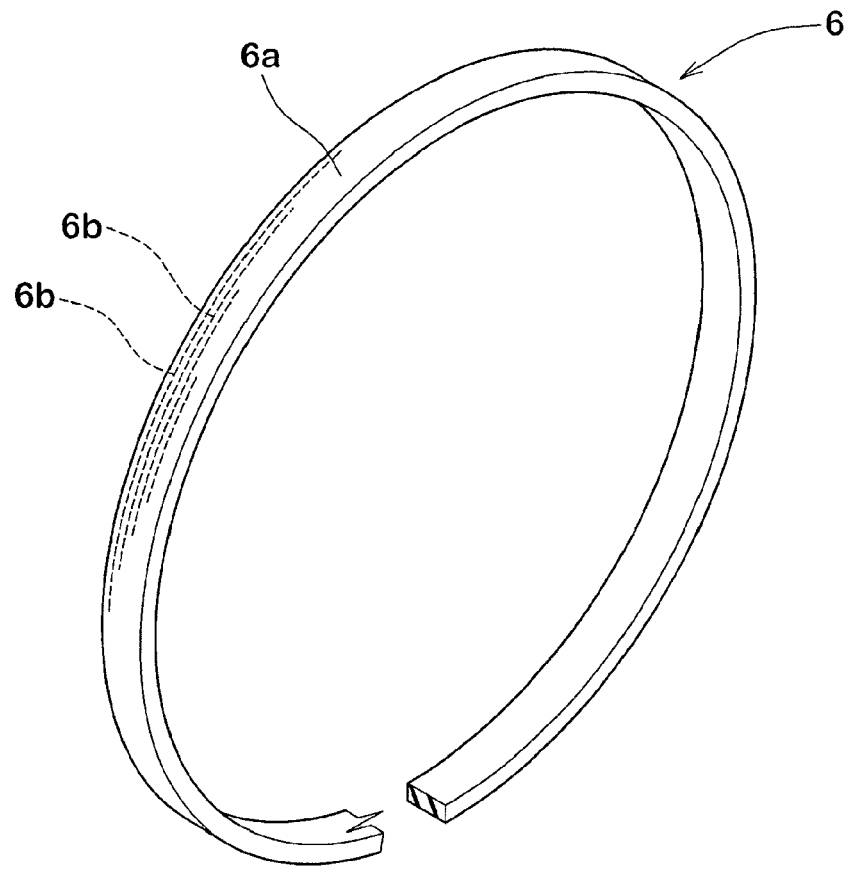
FIG. 7 is a perspective view showing another embodiment of the rubber damper.
Figure 8:
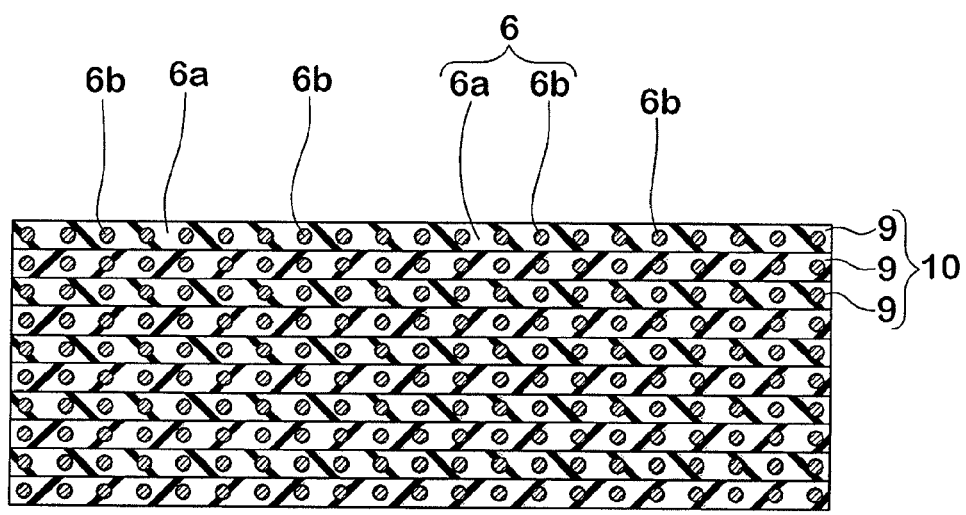
FIG. 8 is a sectional view of FIG. 7.

AS shown in FIG. 7, the rubber damper 6 may be made of complex material including a rubber part 6a and cords 6b for example. In the rubber damper 6 according to the present embodiment, each cord 6b is embedded in the rubber part 6a along the circumferential direction of the rim 3. Such a rubber damper 6 can be formed by vulcanizing a ply laminated body 10 comprising a plurality of laminated cord plies 9 as shown in FIG. 8.

Figure 9A:
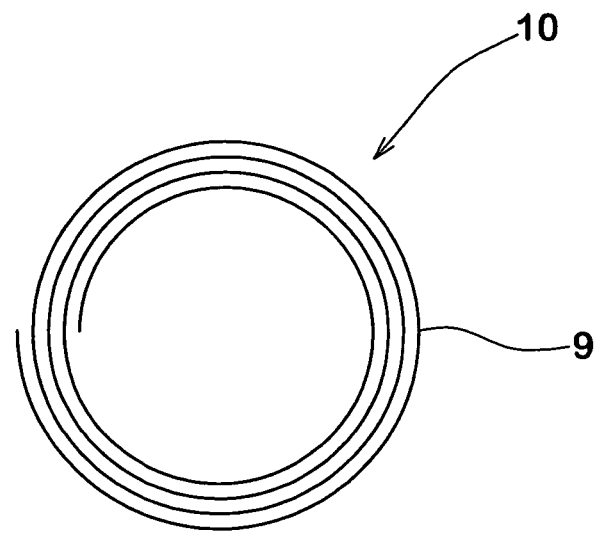
FIG. 9(A) is a schematic side view used for explaining a manufacturing method of a rubber damper.
Figure 9B:
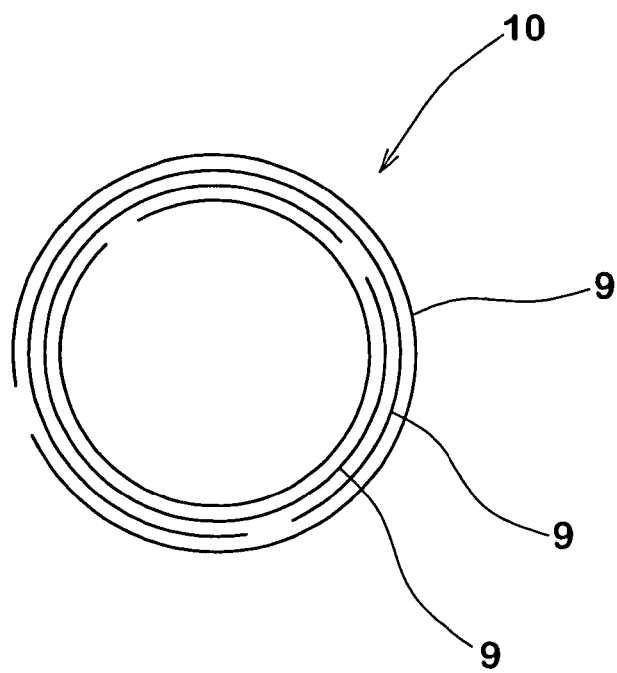
FIG. 9(B) is a schematic side view used for explaining a manufacturing method of another rubber damper.

Each cord ply 9 has a sheet-like body and comprises a plurality of cords 6b arranged in parallel to each other, and non-vulcanized rubber 6a coating the cords 6b. The ply laminated body 10 may be formed by continuously spirally winding the cord ply 9 as shown in FIG. 9(A), or a plurality of ring-like cord plies 9 may be superposed on one another as shown in FIG. 9(B). A combination of those methods shown in FIGS. 9(A) and (B) may be employed.

Figure 10A:
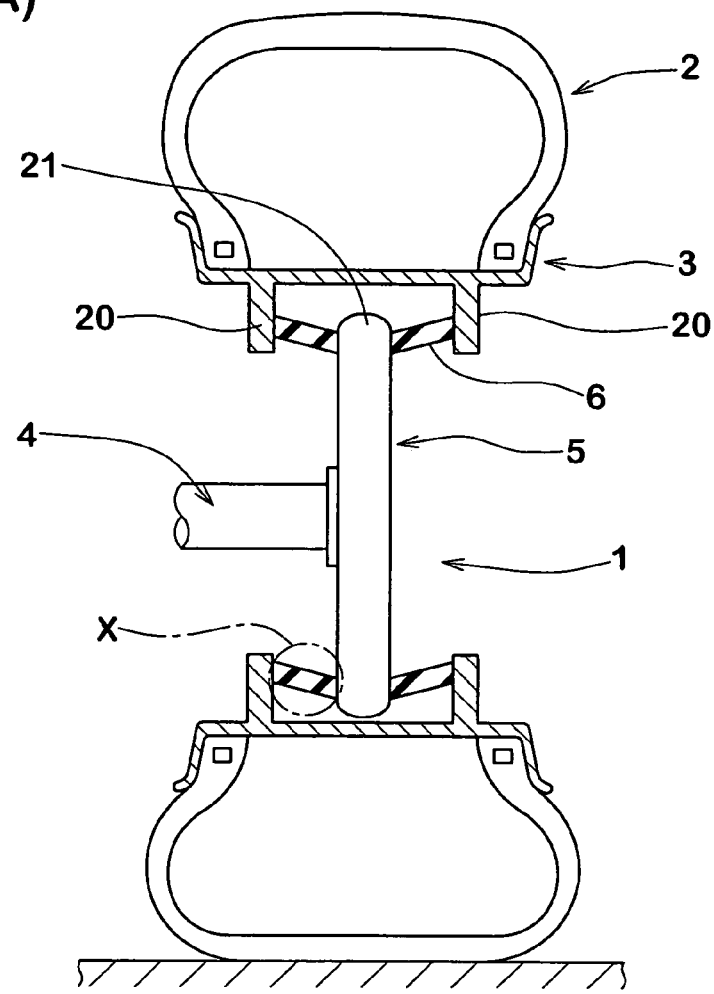
FIG. 10(A) is a sectional view used for explaining a function of the elastic wheel at the time of straight running.
Figure 10B:
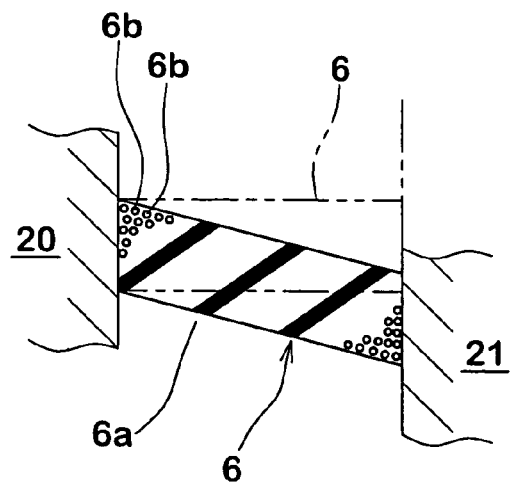
FIG. 10(B) is an enlarged view of an x portion.

FIG. 10(A) is a schematic sectional view of the elastic wheel 1 mounted on a vehicle in its straightly running state, and FIG. 10(B) is an enlarged view of an x portion in FIG. 10(A). The rim 3 relatively rises with respect to the disk 5 by a reaction force from the road. With this, the rubber damper 6 is sheared and deformed between the internal flange 20 and the external flange 21. By the shearing deformation of the rubber damper 6 in accordance with the reaction force from the road, impact and vibration transmitting to the vehicle body are reduced, and the riding comfort and the silence degree at the time of running are enhanced as described above.

The shearing deformation of the rubber damper 6 is deformation which does not produce volume variation thereof. Therefore, since the rubber part 6a of the rubber damper 6 can deform without being obstructed by the cords 6b, rigidity of the elastic wheel 1 with respect to the load in the radial direction (i.e., vertical rigidity) depends on elasticity of the rubber 6a and is small.

Figure 11A:
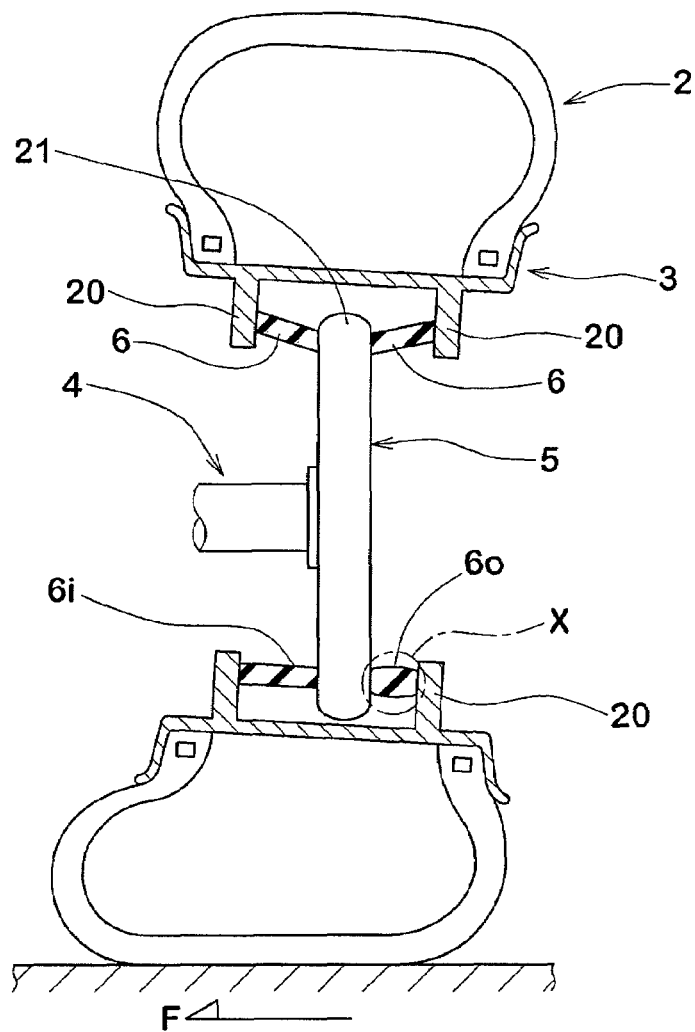
FIG. 11(A) is a sectional view used for explaining a function of the elastic wheel during cornering.
Figure 11B:
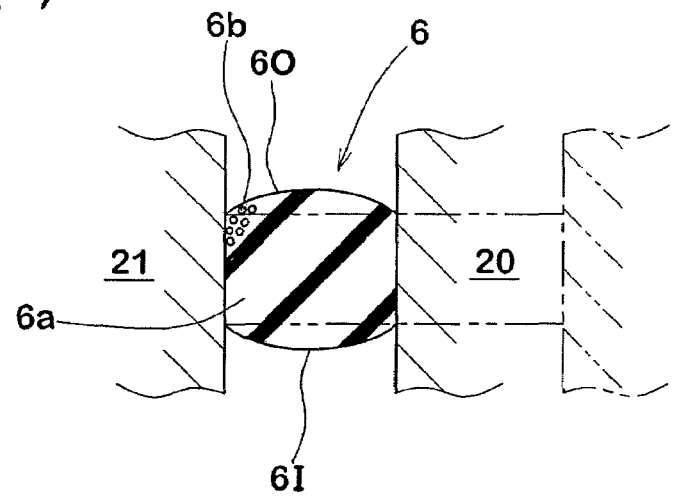
FIG. 11(B) is an enlarged view of an x portion.

FIG. 11(A) is a schematic sectional view of the elastic wheel 1 mounted on the vehicle in its cornering state, and FIG. 11(B) is an enlarged view of an x portion in FIG. 11(A). If a lateral force F from the road is increased, the rim 3 relatively moves in the axial direction with respect to the disk 5. The moving amount is the greatest at a position above a ground-contact part. Between the internal flange 20 and the external flange 21 at this position, tensile deformation along the axial direction occurs in the rubber damper 6i, and compressive deformation along the axial direction occurs in the rubber damper 6O. The compressing force and tensile force causing such a deformation are forces which generate volume variation of the rubber damper 6. However, since the rubber part 6a does not cause volume variation originally, non-restrained surfaces 6O and 6I inside and outside in the radial direction try to expand or contract. At that time, the cords 6b dipped in the rubber part 6a suppress the deformation of the rubber part 6a and thus, apparent rigidity of the rubber damper 6 is increased. Therefore, according to the elastic wheel 1 of the embodiment, the vertical rigidity is reduced, the lateral rigidity is increased, and vibration and noise level can be reduced without largely deteriorating the steering stability.

As for the cord 6b of the rubber damper 6, for example, organic fiber cord such as nylon, polyester, rayon, polyvinyl alcohol, aromatic polyamide, cotton, cellulose resin and crystalline polybutadiene, and inorganic fiber such as boron, glass fiber and carbon fiber, and one or more of them can be used. Preferably, organic fiber cords are used.

Thickness of the cord 6b is not especially limited, but if the thickness is too small, the lateral rigidity tends to be small, and if too thick, adhesion with respect to the rubber part 6a tends to be low. In the case of organic fiber cords, preferable thickness is about from 800 to 2000 dtex, and in the case of inorganic fiber cords such as steel cord, preferable outer diameter is about from 0.5 to 1.0 mm.

Figure 12A:
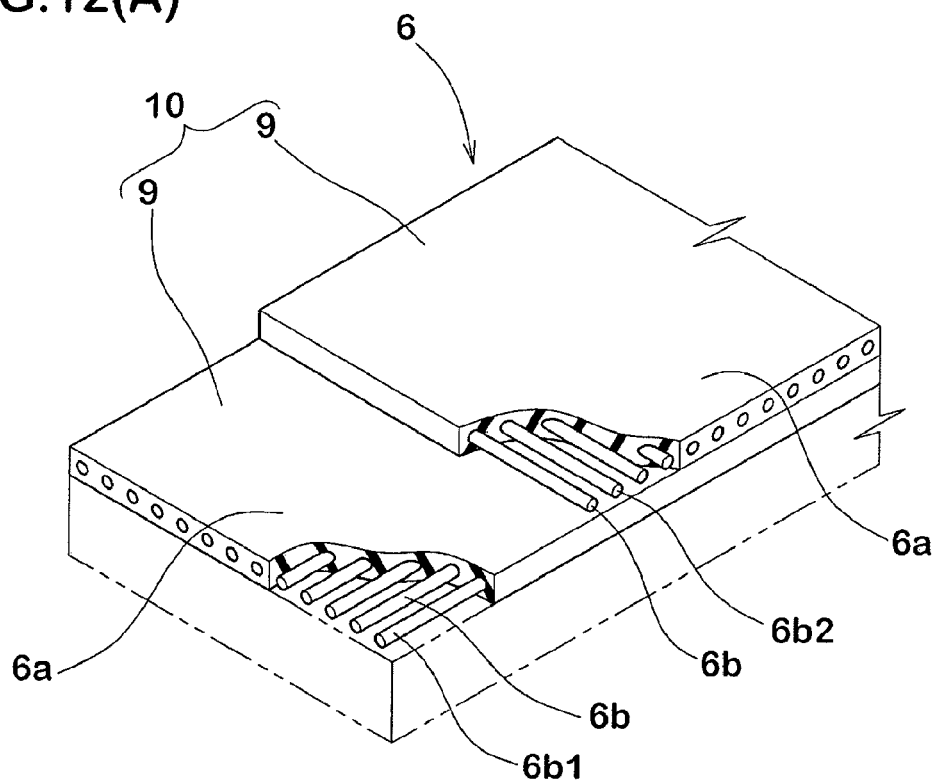
FIG. 12(A) and FIG. 12(B) are perspective views each showing another embodiment of the rubber damper.

As shown in FIG. 12(A), the rubber damper 6 may include cords 6b2 extending along the axial direction. In this embodiment shown in FIG. 12(A), the rubber damper 6 includes parallel cords 6b1 extending along the circumferential direction, and parallel cords 6b2 extending along the axial direction. In this embodiment, the cords 6b1 and 6b2 intersect with each other substantially at right angles. The cords 6b2 extending in the axial direction can work as a great resistance against the axial compression and tensile forces applied thereto generated during cornering. Thus, the lateral rigidity of the rubber damper 6 is further enhanced, and the steering stability is further improved. All of the cords 6b of the rubber damper 6 may be arranged along the axial direction.

Figure 12B:
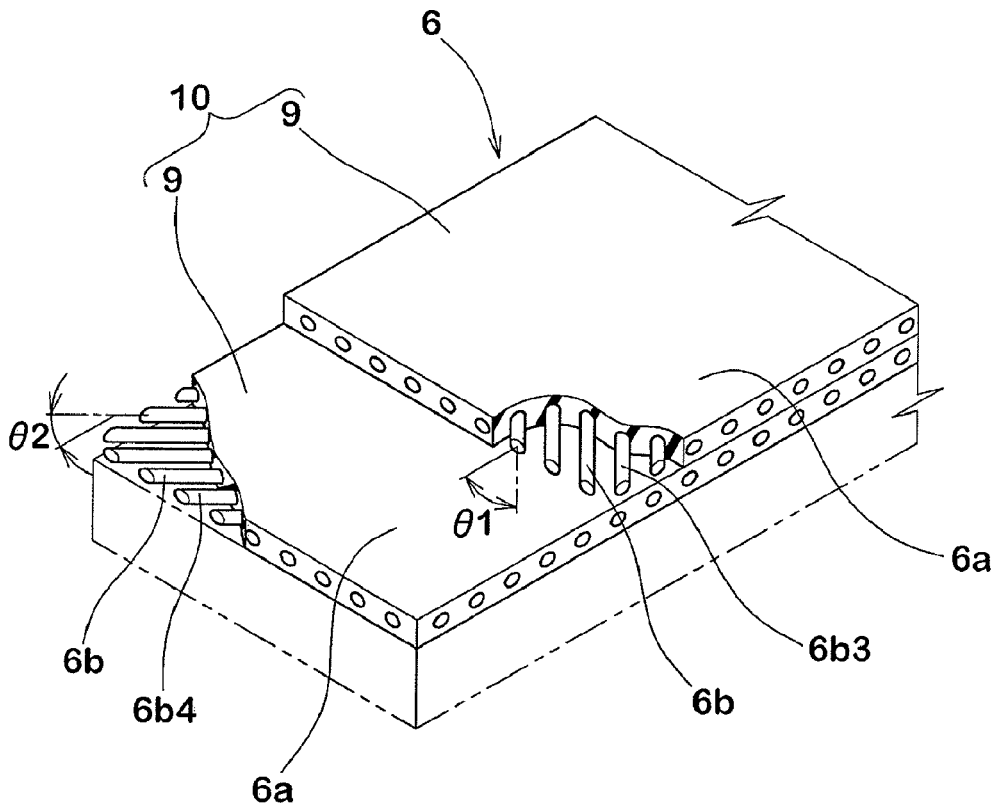

In the embodiment shown in FIG. 12(B), the rubber damper 6 includes the parallel cords 6b3 and 6b4 inclined with respect to the circumferential direction. Especially in this embodiment, the rubber damper 6 comprises: parallel cords 6b3 inclined at an angle theta1 of not less than 10 degrees and not more than 80 degrees with respect to the circumferential direction; and the parallel cords 6b4 inclined at angle theta2 of not less than 10 degrees and not more than 80 degrees with respect to the circumferential direction so as to cross the cords 6b3. Preferably, the cords 6b3 and 6b4 has intersection angle (θ1+θ2) which is greater than 0 degree and not greater than 90°. This rubber damper 6 has high rigidity in the circumferential direction. Thus, like the embodiment shown in FIG. 8, when large torque is applied to the rubber damper 6 when a vehicle is driven or braked, it is possible to suppress large slip in the circumferential direction between the rim 3 and the disk 5. With this, it is possible to improve the response when a vehicle starts or stops.

Figure 13A:
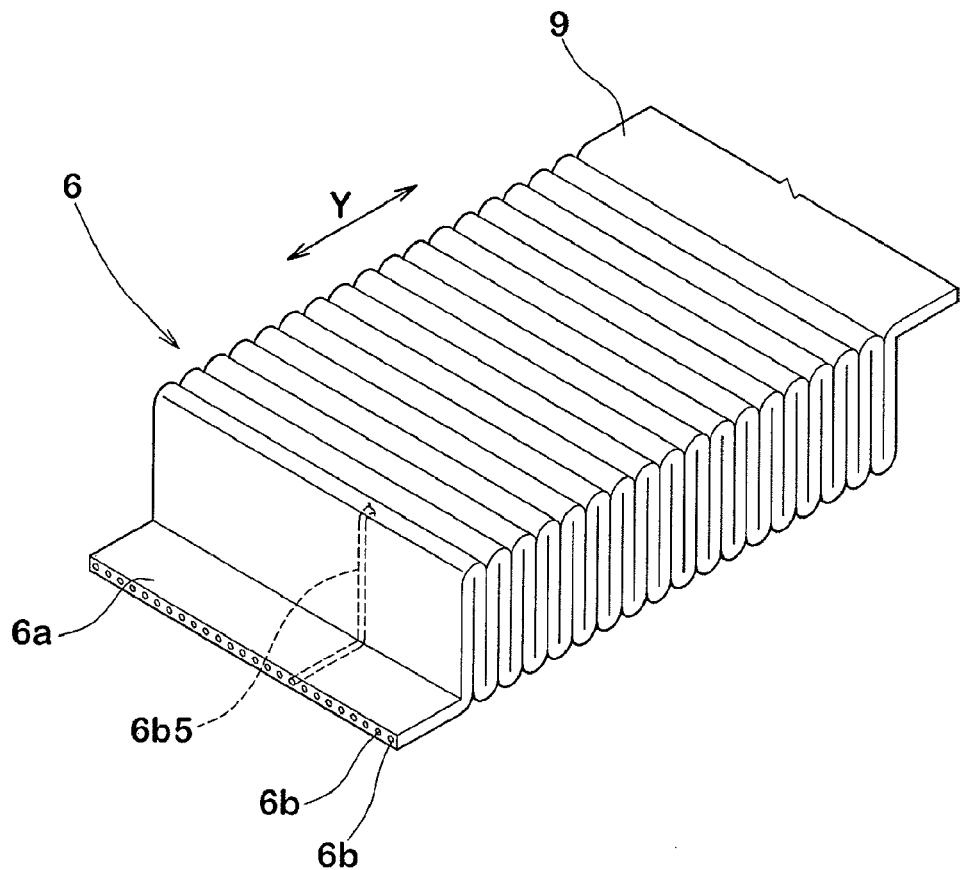
FIG. 13(A) and FIG. 13(B) are perspective views each showing another embodiment of the rubber damper.
Figure 13B:
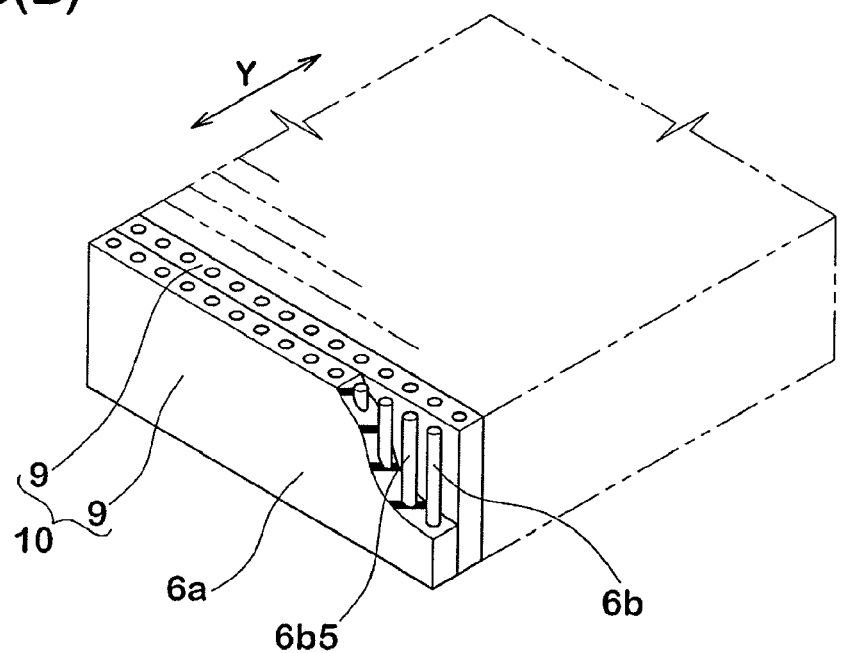

In this embodiment shown in FIGS. 13(A) and (B), the rubber damper 6 includes cords 6b5 extending in the radial direction (it also means the direction of the thickness T of the rubber damper). In this rubber damper 6, the cords 6b5 extending along the radial direction can be formed by folding the cord play comprising cords 6b extending along the circumferential direction Y while continuously bending the same in the radial direction. Further, as shown in FIG. 13(B), rectangular plies including cords 6b5 extending in the radial direction can be superposed and formed in the circumferential direction Y.

Figure 14:
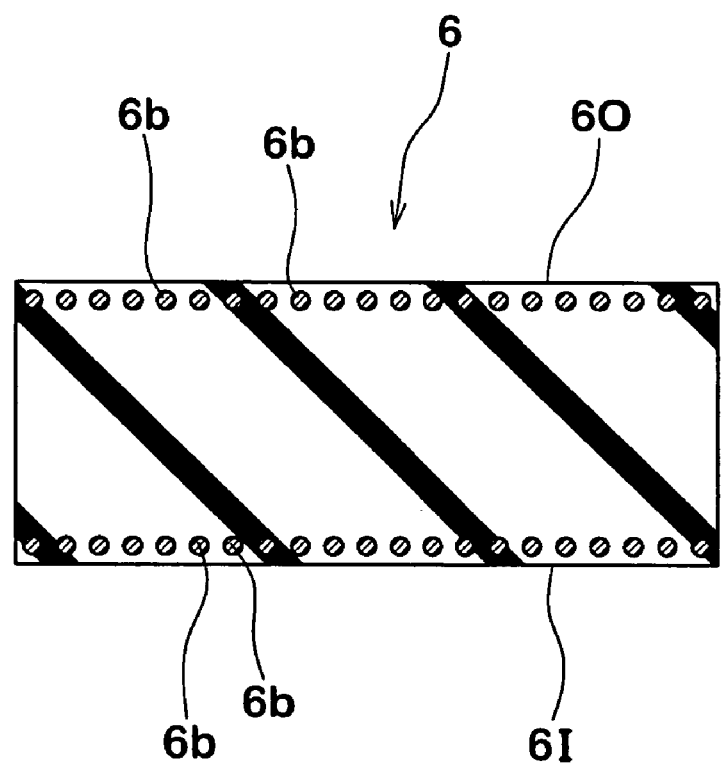
FIG. 14 is a sectional view showing another embodiment of the rubber damper.

AS shown in the sectional view in FIG. 14, the rubber damper 6 can be formed such that a plurality of cords 6b are arranged only in surface layer regions in the vicinity of the non-restrained surfaces 6O and 6I, and a portion therebetween can be formed of only rubber part 6a. In this case, since the non-restrained surfaces 6O and 6I are effectively prevented from being deformed, the lateral rigidity of the rubber damper 6 can be enhanced with small amount of cords.

Figure 15:
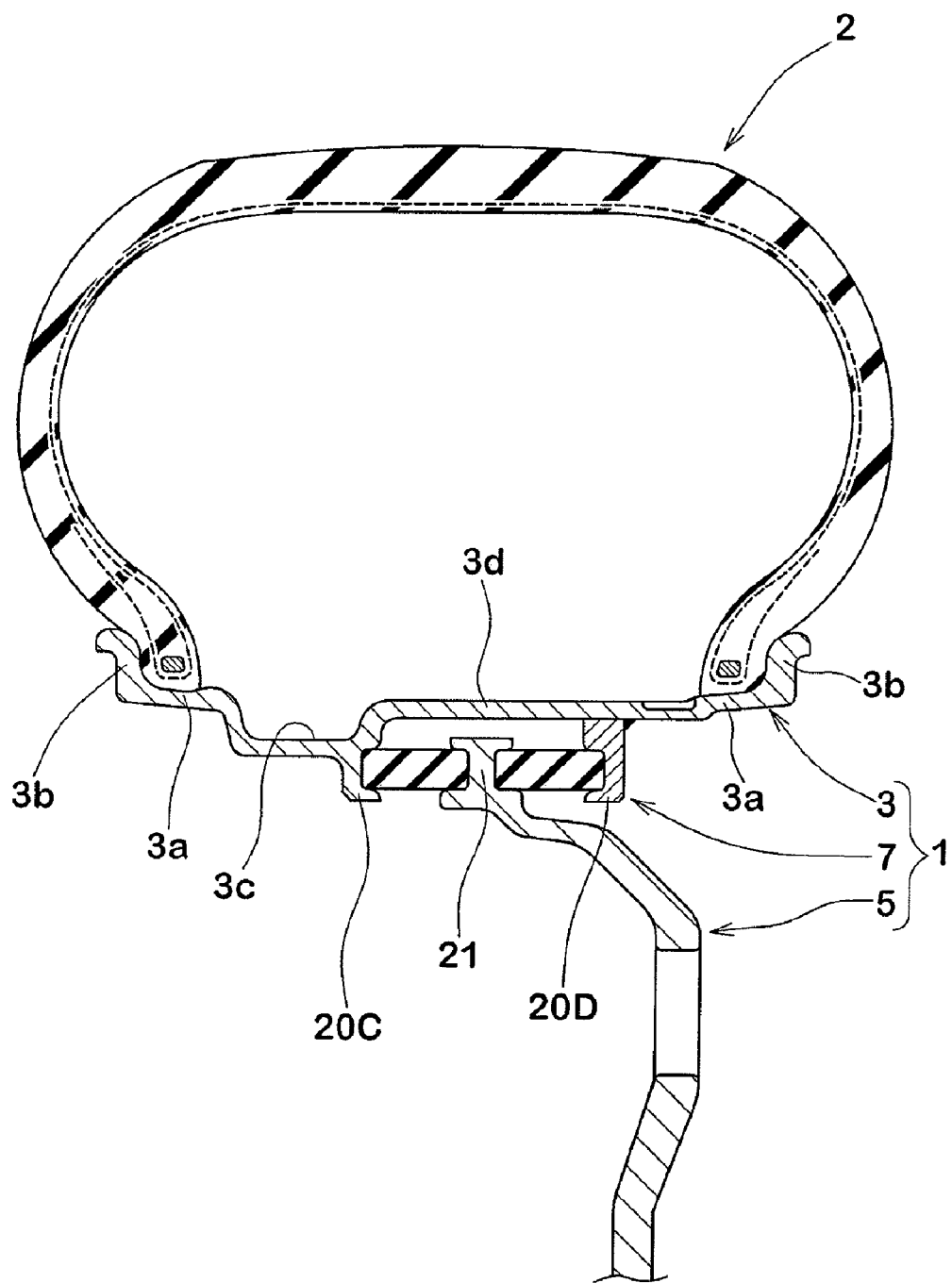
FIG. 15 is a partial sectional view of the elastic wheel according to another embodiment.
Figure 16:
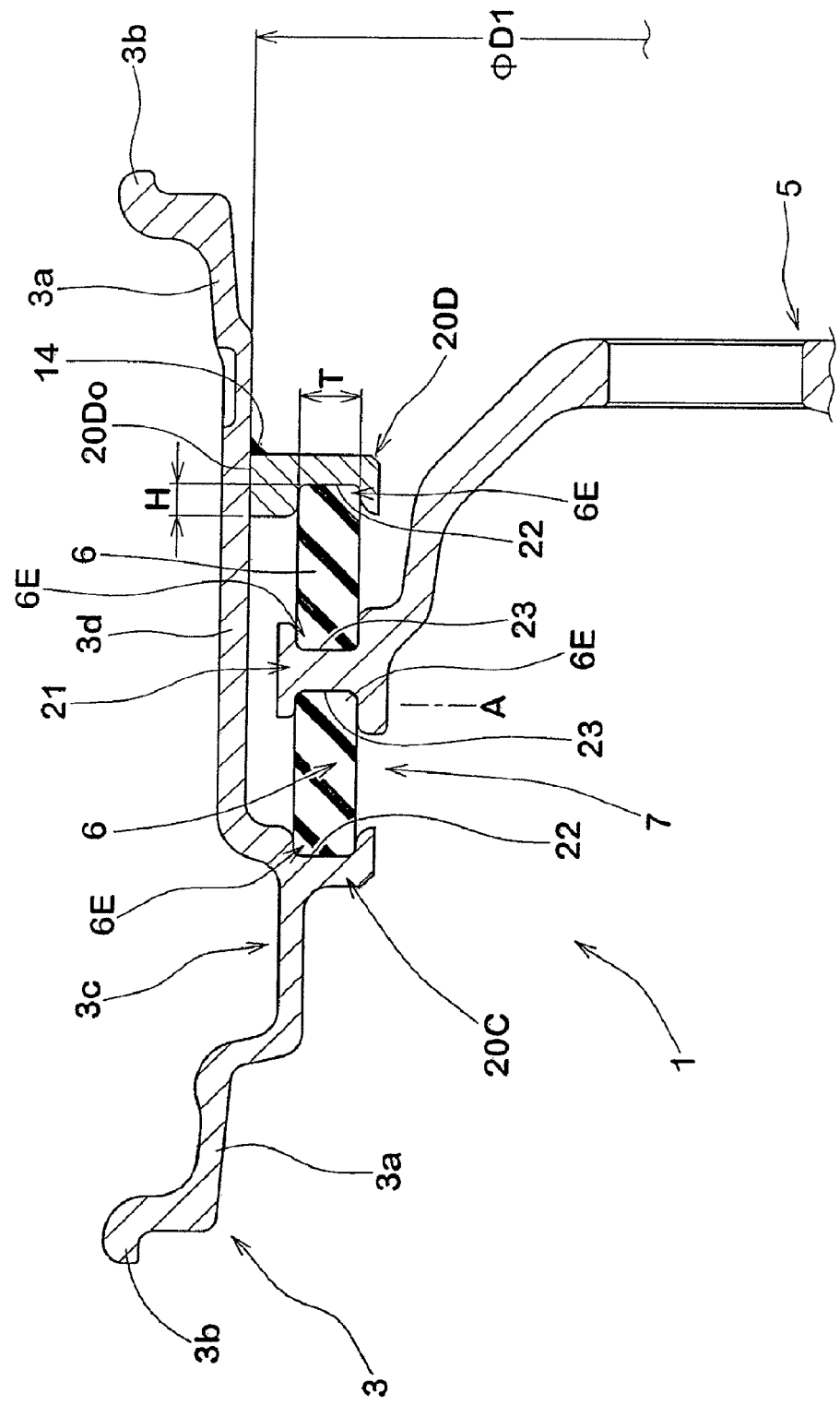
FIG. 16 is a partial enlarged view of FIG. 15.

FIGS. 15 and 16 are partial sectional views of the elastic wheel 1 according to another embodiment of the invention. The rim 3 has substantially the same structure as that of the previous embodiment, but in this embodiment, the well portion 3c and a barrel portion 3d are provided side-by-side between the rim seats 3a. The outer diameter of the barrel portion 3d is larger than that of the well portion 3c and smaller than that of the rim seat 3a, and the barrel portion 3d extends in the axial direction. The well portion 3c is close to one of the rim seats 3a. The barrel portion 3d is wider in the axial direction as compared with the well portion 3c.

In this embodiment, the internal flanges 20 comprise a first internal flange 20c which is previously form on the rim 3 integrally, and a second internal flange 20D which is fixed to the rim 3 by welding later.

The first internal flange 20C is provided on the side of the barrel portion 3d of the well portion 3c in the axial direction. The forming method of the first internal flange 20C is not especially limited, but it is preferable that the first internal flange 20C is previously integrally formed with the rim 3 by casting or forging.

The second internal flange 20D is formed into a ring-like shape with a radially outer peripheral surface 20Do being slightly smaller than an inner diameter D1 of the barrel portion 3d of the rim 3. Therefore, the second internal flange 20D can slide in the axial direction along an inner circumference side of the barrel portion 3d before the second internal flange 20D is welded to the rim 3. The second internal flange 20D can be fitted to the inner circumference side of the barrel portion 3d from one of the flanges 3b (provided on the further side from the well portion 3c). Other structure is substantially the same as that of the previous embodiment.

In the elastic wheel 1 of this embodiment, the rubber damper 6 is disposed in a state in which the rubber damper 6 is compressed between the first groove 22 and the second groove 23. The rubber damper 6 held in this compressed state comes into contact with the groove surfaces of the grooves 22 and 23 under high pressure. With this, extremely high friction forces are obtained in contact surfaces of the internal flange 20 and the rubber damper 6, and contact surfaces of the rubber damper 6 and the external flange 21, and the large slip between both the members in the circumferential direction can be suppressed. In the elastic wheel 1 of this embodiment also, it is unnecessary to vulcanize rubber damper 6 for attaching with the rim 3 or disk 5. Therefore, the elastic wheel 1 can be manufactured using a general wheel manufacturing line, and productivity is largely enhanced.

Figure 17:
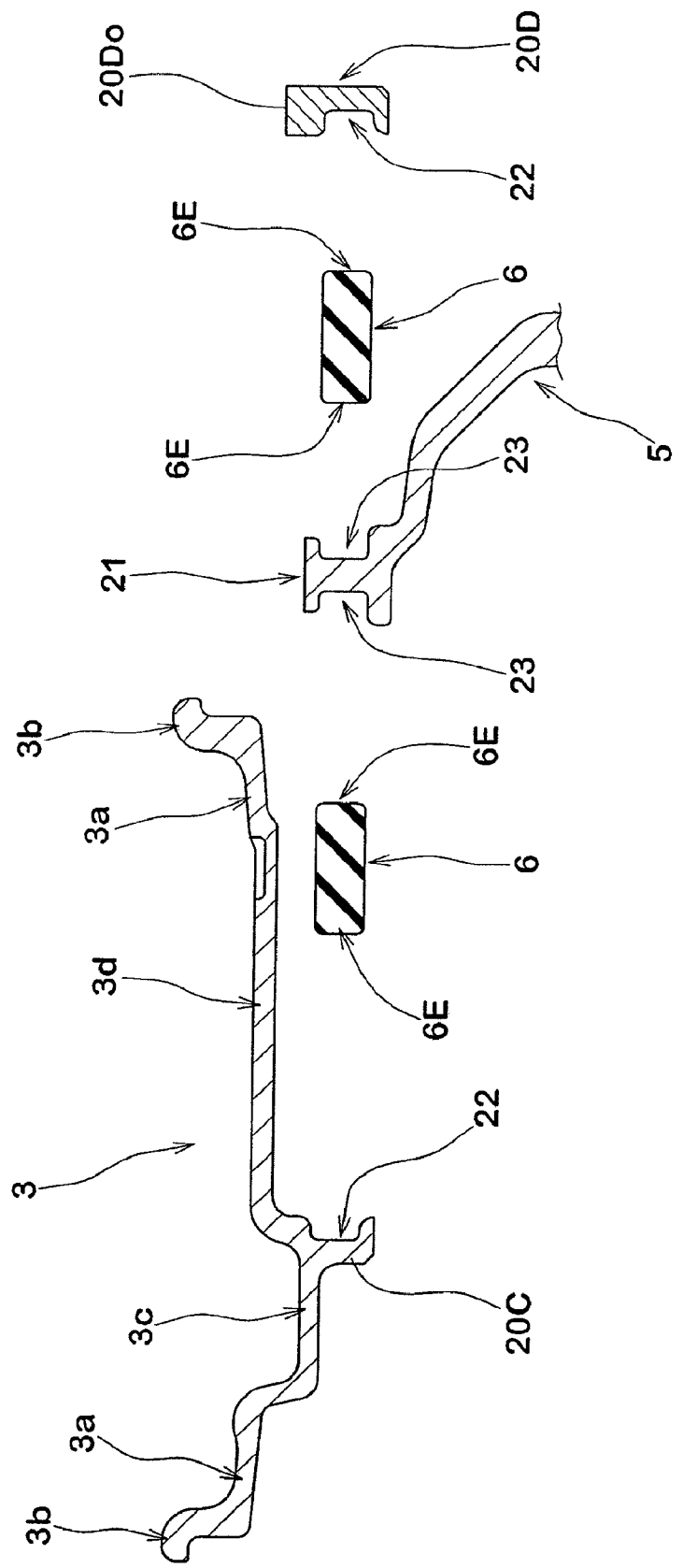
FIG. 17 is an exploded view of FIG. 16.

One example of the manufacturing method of the elastic wheel 1 of this embodiment will be explained next. AS shown in FIG. 17, the rim 3 is prepared. The first internal flange 20C of the pair of internal flanges 20 is previously integrally formed with the inner circumference side of the rim 3 by welding or forging, and the second internal flange 20D is prepared as a separate member from the rim 3. The internal flanges 20C and 20D each are already provided with the first groove 22. The rim 3 is immovably fixed by a jig (not shown).

AS shown in FIG. 17, the rubber dampers 6 and the disk 5 are prepared. Each rubber damper 6 is prepared as annular body which is previously vulcanized in another procedure in this embodiment. The disk 5 is already provided with the external flange 21 having the second groove 23.

Figure 18A:
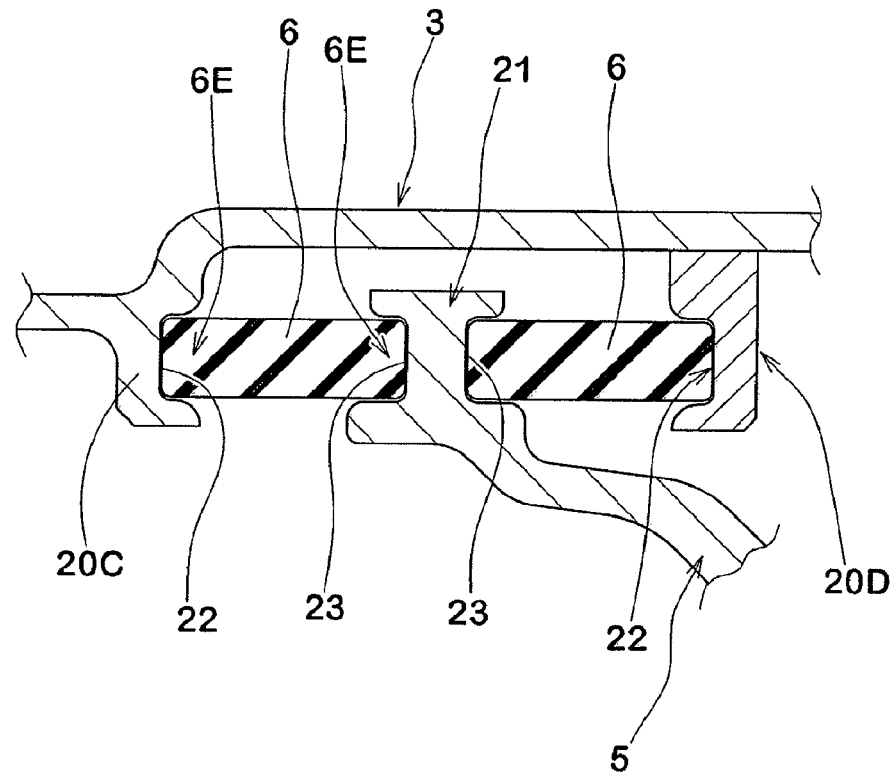
FIG. 18(A) is a sectional view showing a preassembled state of the elastic wheel.

AS shown in FIGS. 17 and 18(A), one of the rubber dampers 6, the external flange 21 of the disk 5, the other rubber damper 6 and the second internal flange 20D are inserted from one of sides of the axial direction toward the first internal flange 20C of the rim 3 sequentially such that these elements are aligned. With this, both ends 6E of the rubber damper 6 are supported between the first groove 22 and the second groove 23, and the rim 3, the rubber damper 6, the disk 5 and the second internal flange 20D are temporarily assembled. At the time of this temporarily assembling, it is unnecessary to dispose these members in regular sequence, and the rubber dampers 6 or the like may be temporarily assembled to the opposed second grooves 23 of the external flange 21 for example.

Figure 18B:
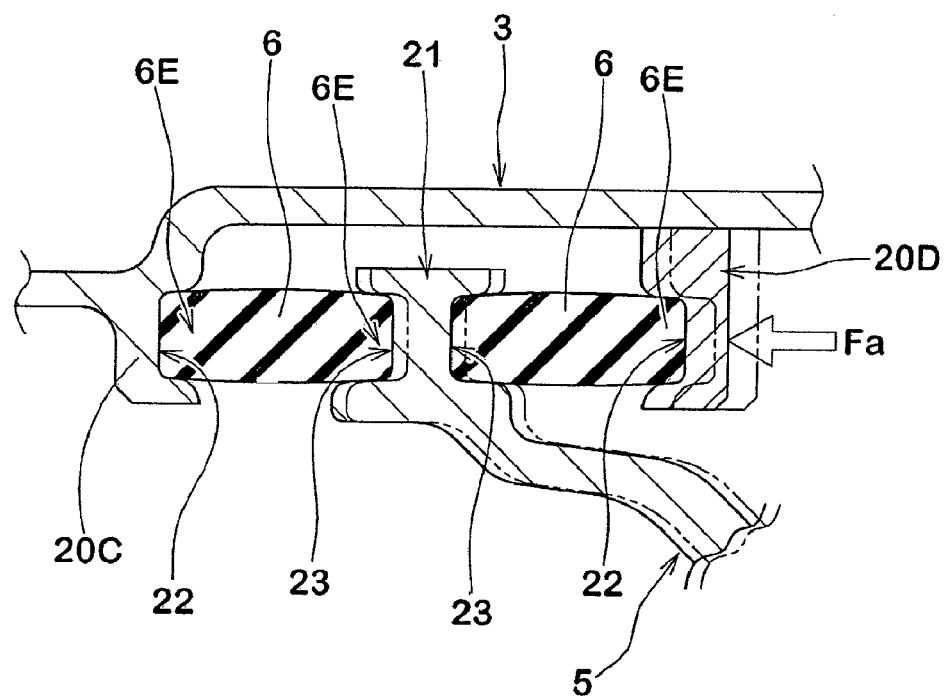
FIG. 18(B) is a sectional view showing a compressed rubber damper.

Next, as shown in FIG. 18(B), the second internal flange 20D is pushed toward the first internal flange 20c in the axial direction. With this, a step for compressing the rubber dampers 6 is carried out. In this step, a press or the like may be used. In the compressing step of the rubber damper 6, the rubber damper 6 is expanded and deformed such that its thickness is increased. With this, the surface comes into tight contact with the surfaces of the grooves 22 and 23 over sufficiently wide ranges, and contact pressures therebetween are enhanced. Further, the contact portion between the rubber damper 6 and the rim 3 and the other contact portion between the rubber damper 6 and the disk 5 each can obtain high friction forces, and the slip in the circumferential direction can be prevented.

The pressing force Fa for compressing the rubber damper 6 is not especially limited, but if the pressing force Fa is excessively small, the friction force between the rubber damper 6 and the grooves 22 and 23 can not sufficiently be enhanced, and there is a tendency that the coupling force therebetween is reduced, the slip is generated and steering stability is deteriorated. It has been found that the steering stability and the noise-reduction performance are enhanced if the pressing force Fa is at a certain level. However, if the pressing force Fa becomes excessively high, there is a possibility that the compression distortion and damage such as crack are prone to be produced in the rubber damper 6, the vibration absorbing ability of the rubber damper 6 is deteriorated, and the noise-reduction performance is deteriorated. From such a point of view, it is preferable that the second internal flange 20D is pushed toward the first internal flange 20C in the axial direction with pressing force Fa of not less than 10 kN and more preferably not less than 15 kN. The upper limit of the pressing force Fa is preferably not more than 30 kN, and more preferably not more than 25 kN.

Next, the compressed state of the rubber damper 6 is maintained and in this state, the second internal flange 20D is welded to the inner circumference side of the rim 3. In this embodiment, as shown in FIG. 16, a welding operation is carried out such that weld metal is provided on a corner part 14 formed between the inner circumference side of the second internal flange 20D and the rim 3 along the circumferential direction.

According to the elastic wheel 1 manufactured by the manufacturing method as described above, the rubber damper 6 made of rubber elastic material is assembled between the rim 3 and the disk 5 without through the vulcanization adhesion. Therefore, the elastic wheel 1 can be manufactured in a conventional and general wheel manufacturing line, and productivity is excellent.

Although the especially preferable embodiments of the present invention have been described in detail, a concrete structure of the invention is not limited to the embodiment, and the invention can be variously modified and carried out within a range not departing from the invention.

Comparison Test

Elastic wheels (example 1) having size of 16×7.0-JJ of the structure shown in FIG. 1 were made in accordance with specification shown in Table 1, and steering stability and noise-reduction performance were tested based on the following references under the actual vehicle running condition. In the elastic wheel of these examples, the rubber damper is made of rubber only. For comparison, aluminum wheels (conventional example) having no rubber damper were also tested. The test method is as follows.

Steering Stability commercially available tires (225/50R16) were mounted on all of the test wheels of a test vehicle (passenger vehicle, 2000 cc) with internal pressure of 230 kPa, and test drive was made on a tire test course having a dry asphalt road. During the test drive, characteristics concerning the steering wheel response, rigidity feeling, grip and the like were evaluated by driver's feeling. A result is shown with indices in which the conventional example is indicated as 100. The higher the numeric value is, the more excellent the result is.

Noise-Reduction Performance

The same vehicle was used for testing noise-reduction performance on a road noise test course at speeds of 60 km/h, and overall noise was measured at a position corresponding to a right ear on the driver. A result of the test is shown in Table 1 and FIG. 19.

TABLE 1

Figure 19:
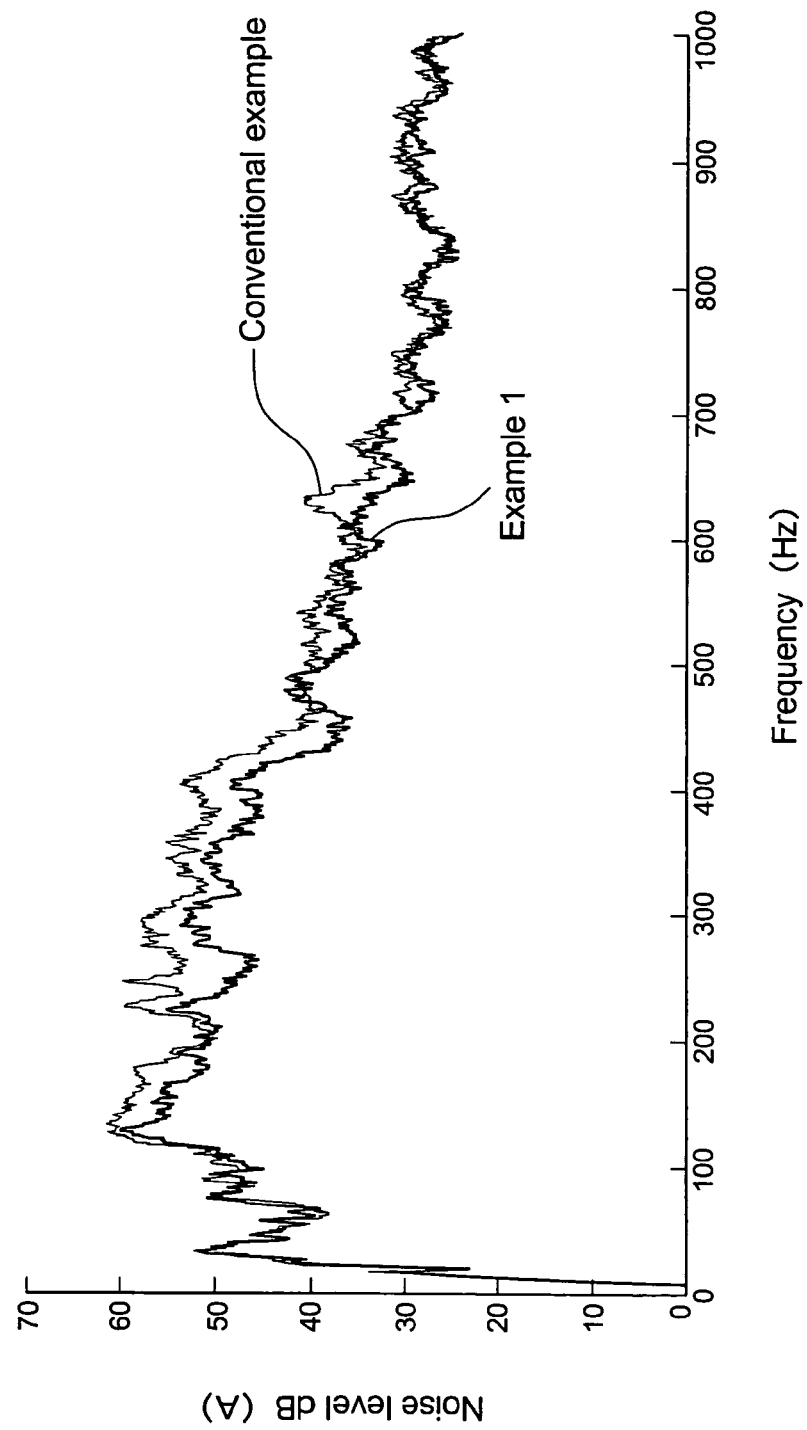
FIG. 19 is a graph showing a result of frequency analysis of noise in a vehicle measured by an actual vehicle running test for an example 1 and a conventional.

|  | Example 1 | Conventional example |
| --- | --- | --- |
| Rubber damper |  | Absence |
| Rubber hardness (degree) | 30 | — |
| Complex elastic modulus E (Mpa) | 3 | — |
| Loss tangent (tan delta) | 0.1 | — |
| Thickness T (mm) | 10 | — |
| The number of divisions n | 8 | — |
| Width alpha in circumferential direction (degree) | 30 | — |
| Distance D1 (mm) | 20 | — |
| Distance D2 (mm) | 9 | — |
| Groove depth H of groove (manufacturing method) (mm) | 5 | — |
| Steering stability | 100 | 100 |
| Noise -reduction performance | FIG. 19 | FIG. 19 |

Next, concerning elastic wheels (examples 2 to 6) in which rubber dampers are made of complex material of rubber part and nylon cords, their riding comfort and steering stability were tested. A cross section of each rubber damper has a thickness of 10 mm and a width of 25 mm. The cord ply has nylon cords each having a diameter of 0.4 mm and the number of cords is one in every 1 mm width of the ply.

These wheels were tested by driving the vehicle on the tire test course under the above-described condition, the riding comfort, steering wheel response, stability at the time of cornering, lane change convergence, and grip when the vehicle starts and stops were evaluated on a driver's feeling. A result is shown on a scale from 1 to 10, and the higher the numeric value is, the more excellent the result is. The test result is shown in Table 2.

As can be understood from those test results, it could be confirmed that the elastic wheel of the embodiment reduces noise without deteriorating the steering stability.

The invention claimed is:

1. An elastic wheel comprising
   a rim for mounting a tire extending in a circumferential direction,
   a disk to be fixed to an axle, and
   a connecting apparatus for connecting elastically between the rim and the disk,

TABLE 2

|  |  | Conventional example | Example 2 | Example 3 | Example 4 | Example 5 | Example 6 |
|---|---|---|---|---|---|---|---|
| Figure showing damper structure |  | — | FIG. 7 | — | Fig. 12 (A) | Fig. 12 (B) | Fig. 13 (B) |
| Angle (deg.) of nylon cord with respect to circumferential direction |  | — | 0 | 90 | 0, 90 Alternately | +45, −45 Alternately | radial direction |
| Test result | Riding comfort | 6 | 6 | 5 | 5 | 6 | 5 |
| Steering stab. | Steering wheel response | 6 | 7 | 8 | 7 | 7 | 7 |
|  | Stability at the time of cornering | 6 | 7 | 8 | 7 | 7 | 7 |
|  | Lane change convergence | 6 | 7 | 8 | 7 | 7 | 7 |
|  | Grip at the time of driving and braking | 6 | 7 | 8 | 7 | 7 | 6 |

Figure 20:
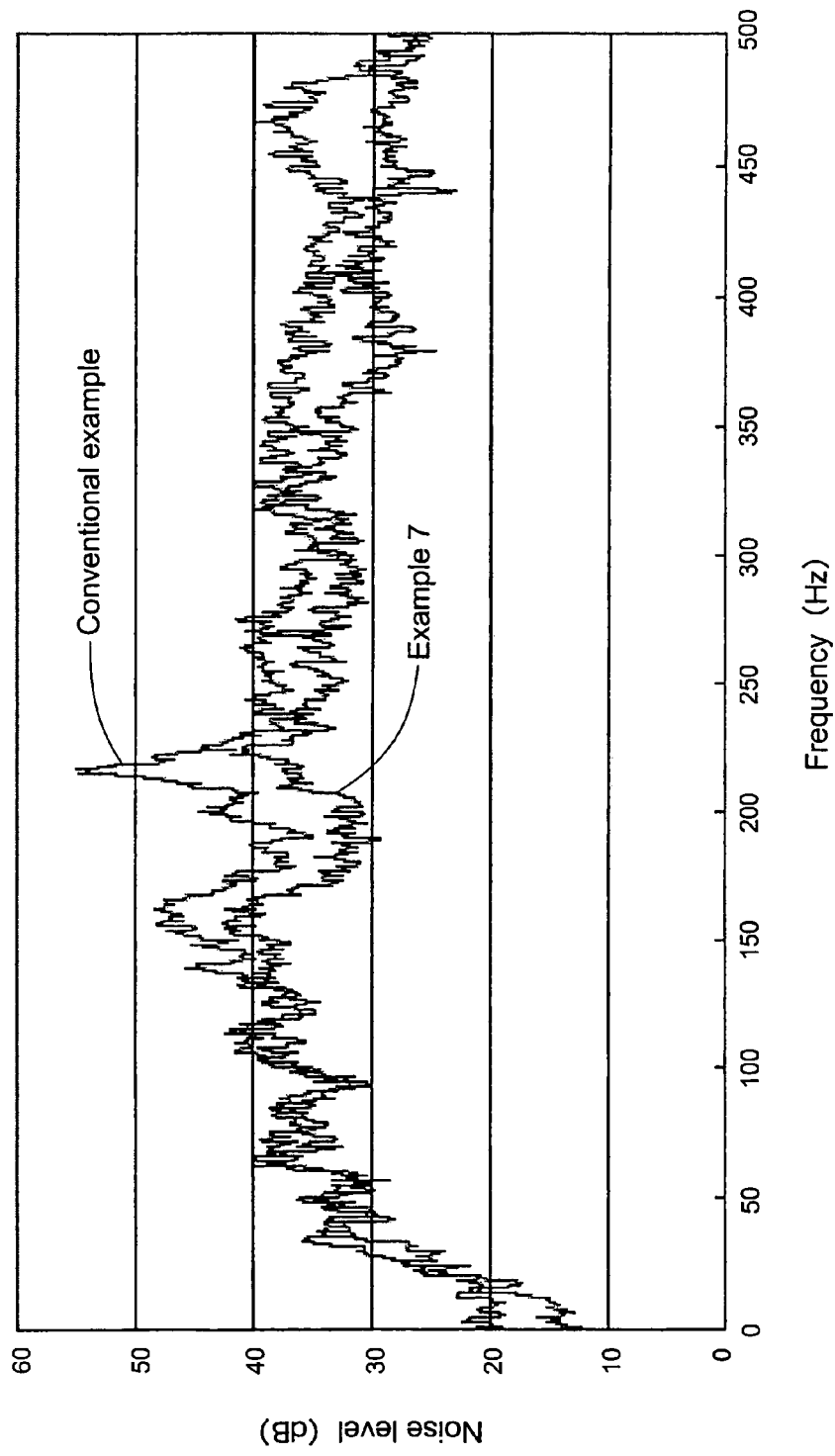
FIG. 20 is a graph showing a result of frequency analysis of noise in a vehicle measured by an actual vehicle running test for an example 7 and a conventional.
Figure 21:
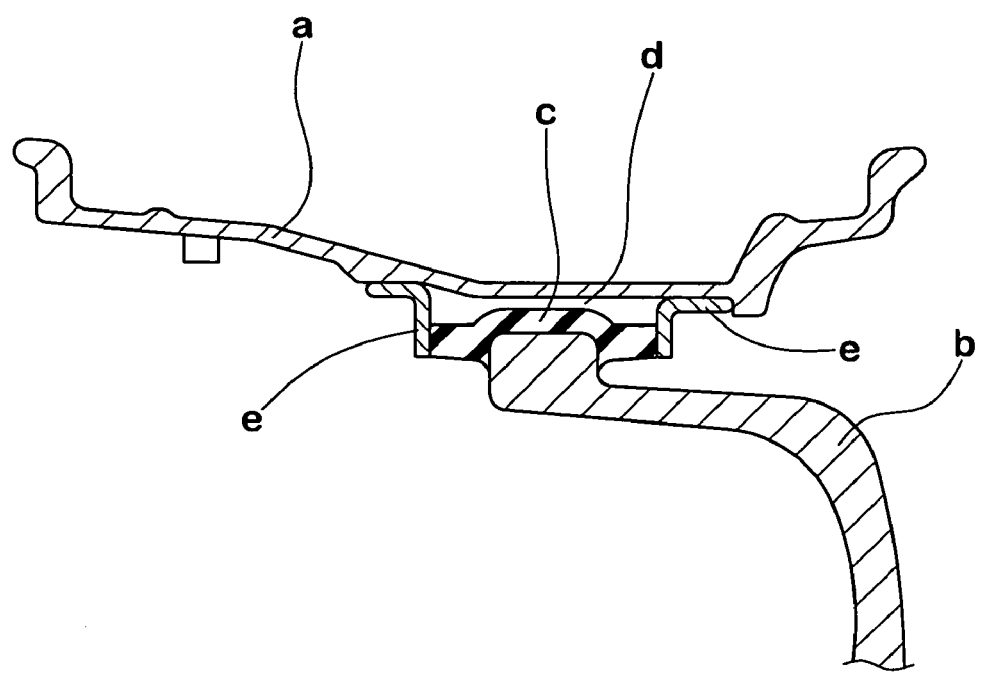
FIG. 21 is a partial sectional view of a conventional elastic wheel.

Next, elastic wheels (examples 7 to 11) of the embodiment shown in FIGS. 15 and 16, steering stability and noise-reduction performance were tested by driving the actual vehicle. In this test, the rim size is 18×8.0-JJ, the tire size was 245/45R18, internal pressure was 230 kPa, and the test vehicle was a passenger vehicle having a piston displacement of 3000 cc. The noise-reduction performance was shown with indices showing peak values at band of 100 to 200 Hz from the frequency analysis result in which aluminum wheel rim (conventional example) is indicated as 100. The smaller the numeric value is, the more excellent the result is. The test result is shown in Table 3. FIG. 20 shows a result of frequency analysis of the conventional example and the example 7.

the connecting apparatus comprising a pair of axially spaced internal flanges each provided on an inner circumferential side of the rim and protruding therefrom radially inwardly and extending in the circumferential direction, an external flange provided on a radially outer portion of the disk, the external flange disposed in a space between the internal flanges with an axial gap on both sides and extending in the circumferential direction, a pair of rubber dampers each disposed in the axial gap and connecting between the internal and external flanges, wherein

TABLE 3

|  | Conventional example | Example 7 | Example 8 | Example 9 | Example 10 | Example 11 |
|---|---|---|---|---|---|---|
| Specification of rubber damper |  |  |  |  |  |  |
| Rubber hardness (°) | — | 3.0 | 3.0 | 3.0 | 3.0 | 3.0 |
| Complex elastic modulus E (Mpa) | — | 3.0 | 3.0 | 3.0 | 3.0 | 3.0 |
| Loss tangent (tan delta) | — | 0.1 | 0.1 | 0.1 | 0.1 | 0.1 |
| Thickness T (mm) | — | 12.0 | 12.0 | 12.0 | 12.0 | 12.0 |
| Width (direction of the axle) (mm) | — | 36.0 | 36.0 | 36.0 | 36.0 | 36.0 |
| Specification of first and second groove |  |  |  |  |  |  |
| Groove width (mm) | — | 13.0 | 13.0 | 13.0 | 13.0 | 13.0 |
| Groove depth (mm) | — | 7.5 | 7.5 | 7.5 | 7.5 | 7.5 |
| Pressing force F (kN) compressing rubber damper | — | 10 | 15 | 20 | 25 | 30 |
| Steering stability (index) | 100 | 95 | 95 | 100 | 100 | 95 |
| Noise-reduction performance (index) | 100 | 95 | 92 | 90 | 90 | 95 | each internal flange is provided on an axially inner side with at least one first groove extending in the circumferential direction, the external flange is provided on both sides with at least one second groove extending in the circumferential direction so as to face the first groove of each internal flange, an axial end of each rubber damper is inserted into the first groove of the internal flange and an opposite axial end is inserted into the second groove of the external flange, and a radial gap is provided between the external flange and the inner circumference side of the rim in the space.

2. The elastic wheel according to claim 1, wherein the internal flange is provided on the axially inner side with a plurality of circumferentially spaced first grooves, the external flange is provided on both sides with a plurality of circumferentially spaced second grooves, and a plurality of circumferentially spaced rubber dampers are disposed in each axial gap.

3. The elastic wheel according to claim 1, wherein at least one internal flange can be detached from the rim.

4. The elastic wheel according to claim 1, wherein at least one internal flange comprises a base portion formed on the inner circumference side of the rim, and a flange plate attached to the base portion by a screw device so that the flange plate can be detached from the base portion.

5. The elastic wheel according to claim 1, wherein a buffer device is provided in the radial gap for reducing the impact force generated when the radially outer surface of the external flange comes into contact with the inner circumference side of the rim.

6. The elastic wheel according to claim 1, wherein the first groove, the second groove and the rubber damper sandwiched therebetween are each an annular shape extending continuously in the circumferential direction.

7. The elastic wheel according to claim 1, wherein the rubber damper comprises a cord reinforced rubber material.

8. The elastic wheel according to claim 1, wherein the rubber damper comprises a cord reinforced rubber material extending in the circumferential direction.

9. The elastic wheel according to claim 1, wherein the rubber damper comprises a cord reinforced rubber material extending in the axial direction.

10. The elastic wheel according to claim 1, wherein the rubber damper comprises a cord reinforced rubber material extending in the radial direction.

11. The elastic wheel according to claim 7, wherein the cord is an organic cord or a steel cord.

12. The elastic wheel according to claim 1, wherein the rubber damper is compressed in the axial direction between the first groove of the internal flange and the second groove of the external flange.

13. The elastic wheel according to claim 12, wherein the internal flanges comprise a first internal flange integrally formed with the rim on the inner circumference side thereof, and a second internal flange welded on the inner circumference side of the rim.

14. A method of manufacturing the elastic wheel according to claim 12, wherein the method comprises the steps of:

preparing the rim by integrally forming the first internal flange on the inner circumference side of the rim, and separately preparing the second internal flange to be attached to the inner circumference side of the rim, preparing the pair of the rubber dampers which were cured, preparing the disk provided with the external flange having the second groove, preassembling the rim, the rubber dampers, the disk and the second internal flange so that axial ends of each rubber damper are inserted in the first groove of each internal flange and the second opposing groove of the external flange, compressing the rubber dampers sandwiched between the first flange and the second flange in the axial direction by pushing the second internal flange toward the first internal flange, and welding the second internal flange to the inner circumference side of the rim while continuing to compress the rubber dampers.

15. The method of manufacturing the elastic wheel according to claim 14, wherein a compression force between the first internal flange and the second internal flange is in the range of from 15 to 25 kN.

16. The elastic wheel according to claim 8, wherein the cord is an organic cord or a steel cord.

17. The elastic wheel according to claim 9, wherein the cord is an organic cord or a steel cord.

18. The elastic wheel according to claim 10, wherein the cord is an organic cord or a steel cord.

* * * * *